United States Patent
Su et al.

(10) Patent No.: US 10,237,801 B2
(45) Date of Patent: Mar. 19, 2019

(54) INTER-RAT AND INTRA-RAT SMALL CELL RESELECTION

(71) Applicant: QUALCOMM Incorporated, San Diego, CA (US)

(72) Inventors: Yi Su, San Jose, CA (US); Sundaresan Tambaram Kailasam, San Diego, CA (US); Feilu Liu, San Diego, CA (US); Yongle Wu, San Diego, CA (US); Joshua Tennyson MacDonald, Boulder, CO (US); Satish Pavan Kumar Nichanametla, Hyderabad (IN); Uzma Khan Qazi, San Marcos, CA (US); Aziz Gholmieh, Del Mar, CA (US); Scott Allan Hoover, Del Mar, CA (US); Feng Lu, Sunnyvale, CA (US)

(73) Assignee: QUALCOMM Incorporated, San Diego, CA (US)

(*) Notice: Subject to any disclaimer, the term of this patent is extended or adjusted under 35 U.S.C. 154(b) by 35 days.

(21) Appl. No.: 14/150,556

(22) Filed: Jan. 8, 2014

(65) Prior Publication Data

US 2015/0079988 A1  Mar. 19, 2015

Related U.S. Application Data

(60) Provisional application No. 61/879,711, filed on Sep. 19, 2013.

(51) Int. Cl.
*H04W 36/30* (2009.01)
*H04W 36/08* (2009.01)
(Continued)

(52) U.S. Cl.
CPC ........... *H04W 36/30* (2013.01); *H04W 36/08* (2013.01); *H04W 48/20* (2013.01); *H04W 84/045* (2013.01)

(58) Field of Classification Search
CPC . H04W 36/14; H04W 36/0016; H04W 36/32; H04W 36/0066; H04W 36/0083;
(Continued)

(56) References Cited

U.S. PATENT DOCUMENTS 8,229,432 B2  7/2012  Fox et al.
8,254,923 B2  8/2012  Jung et al.
(Continued)

FOREIGN PATENT DOCUMENTS

CN  101682872 A  3/2010
CN  102939781 A  2/2013
(Continued)

OTHER PUBLICATIONS

"3rd Generation Partnership Project; Technical Specification Group Radio Access Network; Evolved Universal Terrestrial Radio Access (E-UTRA); User Equipment (UE) procedures in idle mode", Release 11, 3GPP Standard; 3GPP TS 36.304, 3rd Generation Partnership Project (3GPP), Mobile Competence Centre; 650, Route Des Lucioles; F-06921 Sophia-Antipolis Cedex; France, vol. RAN WG2, No. V11.5.0, Sep. 17, 2013 (Sep. 17, 2013), pp. 1-34, XP050712297, [retrieved on Sep. 17, 2013] p. 18, paragraph 5.2.4—p. 19, paragraph 5.2.4.2 p. 21, paragraph 5.2.4.5.—p. 22, paragraph 5.2.4.6. p. 25, paragraph 5.2.4.8.1.

(Continued)

*Primary Examiner* — Matthew C Sams
(74) *Attorney, Agent, or Firm* — Muncy, Geissler, Olds & Lowe

(57) ABSTRACT

Cell reselection for transitioning a user device from a macro cell to a small cell may be performed by comparing a first
(Continued)

reselection candidate small cell and a second reselection candidate small cell based on reselection criteria, and selecting a final reselection candidate based on the comparison.

28 Claims, 12 Drawing Sheets

(51) Int. Cl.
*H04W 48/20* (2009.01)
*H04W 84/04* (2009.01)

(58) Field of Classification Search
CPC . H04W 36/0094; H04W 36/30; H04W 36/36; H04W 48/20; H04W 84/045; H04W 88/06
See application file for complete search history.

(56) References Cited

U.S. PATENT DOCUMENTS

| | | | | |
|---|---|---|---|---|
| 8,457,070 | B2* | 6/2013 | Park | H04W 36/0066 370/331 |
| 8,543,117 | B2* | 9/2013 | Martin | H04W 24/10 455/435.1 |
| 8,706,115 | B2* | 4/2014 | Pani | H04W 36/30 455/436 |
| 8,908,639 | B2* | 12/2014 | Nguyen | 370/331 |
| 8,929,331 | B2* | 1/2015 | Karaoguz | H04W 36/04 370/331 |
| 9,025,534 | B2* | 5/2015 | Karaoguz | H04W 28/16 370/329 |
| 9,130,713 | B2* | 9/2015 | Li | |
| 9,185,616 | B2* | 11/2015 | Choi-Grogan | H04W 4/90 |
| 2005/0277416 | A1* | 12/2005 | Tolli | H04W 36/0094 455/436 |
| 2006/0040700 | A1* | 2/2006 | Roberts | H04W 36/14 455/525 |
| 2008/0305801 | A1* | 12/2008 | Burgess | H04W 36/04 455/444 |
| 2009/0068969 | A1* | 3/2009 | Lindoff | H04W 48/18 455/161.1 |
| 2009/0088160 | A1* | 4/2009 | Pani | H04W 36/30 455/436 |
| 2009/0093252 | A1* | 4/2009 | Czaja | H04W 52/343 455/436 |
| 2009/0131049 | A1* | 5/2009 | Osborn | H04W 76/022 455/435.1 |
| 2009/0137249 | A1 | 5/2009 | Horn et al. | |
| 2010/0016022 | A1* | 1/2010 | Liu | H04W 48/08 455/561 |
| 2010/0029274 | A1* | 2/2010 | Deshpande | H04J 11/0093 455/435.3 |
| 2010/0093354 | A1* | 4/2010 | Agashe | H04W 36/04 455/436 |
| 2010/0124931 | A1* | 5/2010 | Eskicioglu et al. | 455/440 |
| 2010/0167728 | A1* | 7/2010 | Venkitaraman | H04W 36/04 455/434 |
| 2010/0203891 | A1* | 8/2010 | Nagaraja | H04W 36/08 455/436 |
| 2010/0240368 | A1* | 9/2010 | Fox | H04W 36/04 455/435.3 |
| 2010/0285793 | A1* | 11/2010 | Yoon | H04W 48/16 455/422.1 |
| 2010/0296487 | A1* | 11/2010 | Karaoguz | H04W 36/04 370/332 |
| 2011/0039520 | A1* | 2/2011 | Maida | H04W 36/0083 455/411 |
| 2011/0053600 | A1* | 3/2011 | Rajasimman | H04W 36/0061 455/442 |
| 2011/0170481 | A1* | 7/2011 | Gomes | H04W 36/0083 370/328 |
| 2011/0194530 | A1* | 8/2011 | Tinnakornsrisuphap | H04W 36/04 370/331 |
| 2011/0250891 | A1* | 10/2011 | Zou et al. | 455/437 |
| 2011/0319076 | A1* | 12/2011 | Ramasamy | H04W 48/16 455/434 |
| 2011/0319083 | A1* | 12/2011 | Lee | H04W 36/00 455/436 |
| 2012/0115485 | A1* | 5/2012 | Narasimha | H04W 68/02 455/437 |
| 2012/0135731 | A1* | 5/2012 | Rangaiah | H04W 48/20 455/434 |
| 2012/0170473 | A1* | 7/2012 | Das | H04W 36/0083 370/252 |
| 2012/0214483 | A1* | 8/2012 | Tong | H04W 36/0022 455/434 |
| 2012/0276903 | A1* | 11/2012 | Han | H04W 24/02 455/436 |
| 2012/0282931 | A1* | 11/2012 | Giustina | H04W 36/22 455/437 |
| 2012/0315905 | A1* | 12/2012 | Zhu et al. | 455/436 |
| 2012/0322450 | A1* | 12/2012 | Karaoguz | H04L 12/4625 455/436 |
| 2013/0045746 | A1* | 2/2013 | Tsuneda | H04W 24/02 455/437 |
| 2013/0079011 | A1* | 3/2013 | Duda | H04L 12/2439 455/436 |
| 2013/0095835 | A1* | 4/2013 | Carmon | H04W 36/0083 455/437 |
| 2013/0143542 | A1* | 6/2013 | Kovvali | H04W 48/18 455/418 |
| 2013/0188624 | A1* | 7/2013 | Lee | H04W 24/02 370/338 |
| 2013/0308481 | A1* | 11/2013 | Kazmi | H04W 24/02 370/252 |
| 2014/0092828 | A1* | 4/2014 | Sirotkin | H04L 1/1864 370/329 |
| 2014/0274195 | A1* | 9/2014 | Singh | H04W 52/241 455/522 |
| 2014/0369329 | A1* | 12/2014 | Lee | H04W 28/06 370/338 |

FOREIGN PATENT DOCUMENTS

| | | |
|---|---|---|
| EP | 2453704 A1 | 5/2012 |
| EP | 2557842 A1 | 2/2013 |
| JP | 2013516930 A | 5/2013 |
| WO | 9903290 A1 | 1/1999 |
| WO | 2008157573 A1 | 12/2008 |
| WO | 2009115862 A1 | 9/2009 |
| WO | WO 2009115862 A1 * | 9/2009 ........ H04W 36/0083 |
| WO | WO-2009115862 A1 * | 9/2009 ........ H04W 36/0083 |
| WO | 2011004828 A1 | 1/2011 |
| WO | 2011085324 A1 | 7/2011 |
| WO | 2012035902 A1 | 3/2012 |
| WO | WO-2012072712 A1 | 6/2012 |
| WO | WO-2013066123 A1 | 5/2013 |

OTHER PUBLICATIONS

International Search Report and Written Opinion—PCT/US2014/054766—ISA/EPO—dated Dec. 10, 2014.
3GPP TS 25.304, "3rd Generation Partnership Project; Technical Specification Group Radio Access Network; User Equipment (UE) procedures in idle mode and procedures for cell reselection in connected mode (Release 9)", V9.8.0, Sep. 2012, pp. 1-50.
3GPP TS 25.367, "3rd Generation Partnership Project; Technical Specification Group Radio Access Network; Mobility procedures for Home Node B (HNB); Overall description; Stage 2 (Release 9)", V9.5.0, Dec. 2010, pp. 1-14.
3GPP TS 36.304, "3rd Generation Partnership Project; Technical Specification Group Radio Access Network; Evolved Universal

(56) References Cited

OTHER PUBLICATIONS

Terrestrial Radio Access (E-UTRA); User Equipment (UE) procedures in idle mode (Release 9)", V9.11.0, Jun. 2012, pp. 1-32.

* cited by examiner

INTER-RAT AND INTRA-RAT SMALL CELL RESELECTION

CROSS-REFERENCE TO RELATED APPLICATIONS

The present application for patent claims the benefit of U.S. Provisional Application No. 61/879,711, entitled "INTER-RAT AND INTRA-RAT FEMTO CELL RESELECTION," filed Sep. 19, 2013, assigned to the assignee hereof, and expressly incorporated herein by reference in its entirety.

BACKGROUND

Aspects of this disclosure relate generally to telecommunications, and more particularly to cell reselection for small cells and the like.

Wireless communication systems are widely deployed to provide various types of communication content, such as voice, data, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Third Generation Partnership Project (3GPP), 3GPP Long Term Evolution (LTE), Ultra Mobile Broadband (UMB), Evolution Data Optimized (EV-DO), Institute of Electrical and Electronics Engineers (IEEE), etc.

In cellular networks, macro scale base stations (or macro NodeBs (MNBs)) provide connectivity and coverage to a large number of users over a certain geographical area. A macro network deployment is carefully planned, designed, and implemented to offer good coverage over the geographical region. Even such careful planning, however, cannot fully accommodate channel characteristics such as fading, multipath, shadowing, etc., especially in indoor environments. Indoor users therefore often face coverage issues (e.g., call outages and quality degradation) resulting in poor user experience.

To extend cellular coverage indoors, such as for residential homes and office buildings, additional small coverage, typically low power base stations have recently begun to be deployed to supplement conventional macro networks, providing more robust wireless coverage for mobile devices. These small coverage base stations are commonly referred to as Home NodeBs or Home eNBs (collectively, H(e)NBs), femto nodes, femto cells, small cells, small cell base stations, pico nodes, micro nodes, etc., deployed for incremental capacity growth, richer user experience, in-building or other specific geographic coverage, and so on. Such small coverage base stations may be connected to the Internet and the mobile operator's network via a digital subscriber line (DSL) router or a cable modem, for example.

Cell reselection from macro cells to small cells is generally supported on conventional cellular modems. However, current cellular communication standards such as those provided by 3GPP do not specify how to select a particular small cell candidate from: (1) multiple frequencies within a serving Radio Access Technology (RAT) of the macro cell; (2) multiple frequencies within a non-serving RAT; or (3) multiple frequencies from different RATs (e.g., one or more from a serving RAT or one or more from each non-serving RAT).

There accordingly remains a need for more robust reselection criteria and associated algorithms and systems, covering inter-RAT and intra-RAT small cell reselection.

SUMMARY

Systems and methods for inter-RAT and intra-RAT small cell reselection are disclosed.

A method of cell reselection for transitioning a user device from a macro cell to a small cell is disclosed. The method may include, for example, comparing a first reselection candidate small cell and a second reselection candidate small cell based on reselection criteria, and selecting a final reselection candidate based on the comparison.

An apparatus for cell reselection to transition a user device from a macro cell to a small cell is also disclosed. The apparatus may include, for example, a processor and memory coupled to the processor for storing related data and/or instructions. The processor may be configured to compare a first reselection candidate small cell and a second reselection candidate small cell based on reselection criteria, and to select a final reselection candidate based on the comparison.

Another apparatus for cell reselection to transition a user device from a macro cell to a small cell is also disclosed. The apparatus may include, for example, means for comparing a first reselection candidate small cell and a second reselection candidate small cell based on reselection criteria, and means for selecting a final reselection candidate based on the comparison.

A computer-readable medium comprising code, which, when executed by a processor, causes the processor perform operations for cell reselection to transition a user device from a macro cell to a small cell is also disclosed. The computer-readable medium may include, for example, code for comparing a first reselection candidate small cell and a second reselection candidate small cell based on reselection criteria, and code for selecting a final reselection candidate based on the comparison.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific aspects disclosed. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment or aspect described herein as "exemplary" is not necessarily to be construed as preferred or advantageous over other aspects. Likewise, the term "aspect disclosed" does not require that all aspects disclosed include the discussed feature, advantage or mode of operation. It will therefore be appreciated that the terminology used herein is for the purpose of describing particular aspects only and is not intended to be limiting of various aspects of the invention.

As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

In relation to the background above, the techniques described herein provide improved cell reselection for transitioning a user device from a macro cell to a small cell. As is explained in more detail below, the techniques described herein particularly provide for advanced inter-RAT and intra-RAT small cell reselection criteria, which may be used to select a reselection candidate small cell for each available RAT and to compare the different reselection candidate small cells to determine a final reselection candidate. In this way, a preferred reselection candidate may be better identified among a plurality of potential small cells that may be operating in the user device's vicinity on various RATs and various associated operating frequencies.

Figure 1:
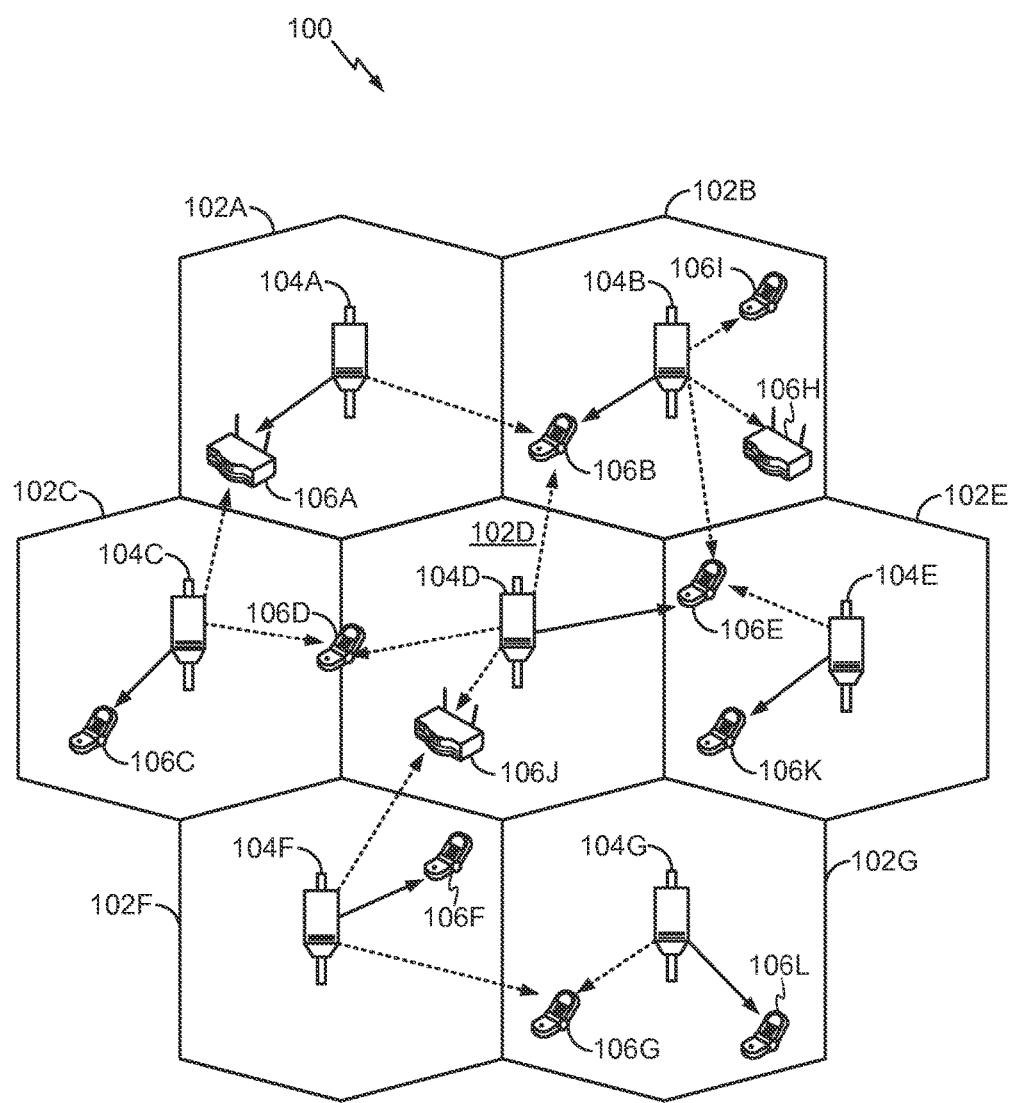
FIG. 1 illustrates an example wireless communication network.

FIG. 1 illustrates an example wireless communication network demonstrating the principles of multiple access communication. The illustrated wireless communication network 100 is configured to support communication between a number of users. As shown, the wireless communication network 100 may be divided into one or more cells 102, such as the illustrated cells 102A-102G. Communication coverage in cells 102A-102G may be provided by one or more base stations 104, such as the illustrated base stations 104A-104G. In this way, each base station 104 may provide communication coverage to a corresponding cell 102. The base station 104 may interact with a plurality of user devices 106, such as the illustrated user devices 106A-106L.

Each user device 106 may communicate with one or more of the base stations 104 on a downlink (DL) and/or an uplink (UL). In general, a DL is a communication link from a base station to a user device, while an UL is a communication link from a user device to a base station. The base stations 104 may be interconnected by appropriate wired or wireless interfaces allowing them to communicate with each other and/or other network equipment. Accordingly, each user device 106 may also communicate with another user device 106 through one or more of the base stations 104. For example, the user device 106J may communicate with the user device 106H in the following manner: the user device 106J may communicate with the base station 104D, the base station 104D may then communicate with the base station 104B, and the base station 104B may then communicate with the user device 106H, allowing communication to be established between the user device 106J and the user device 106H.

The wireless communication network 100 may provide service over a large geographic region. For example, the cells 102A-102G may cover a few blocks within a neighborhood or several square miles in a rural environment. In some systems, each cell may be further divided into one or more sectors (not shown). In addition, the base stations 104 may provide the user devices 106 access within their respective coverage areas to other communication networks, such as the Internet or another cellular network. Each user device 106 may be a wireless communication device (e.g., a mobile phone, router, personal computer, server, etc.) used by a user to send and receive voice or data over a communications network, and may be alternatively referred to as an Access Terminal (AT), a Mobile Station (MS), a User Equipment (UE), etc. In the example shown in FIG. 1, the user devices 106A, 106H, and 106J comprise routers, while the user devices 106B-106G, 106I, 106K, and 106L comprise mobile phones. Again, however, each of the user devices 106A-106L may comprise any suitable communication device.

Figure 2:
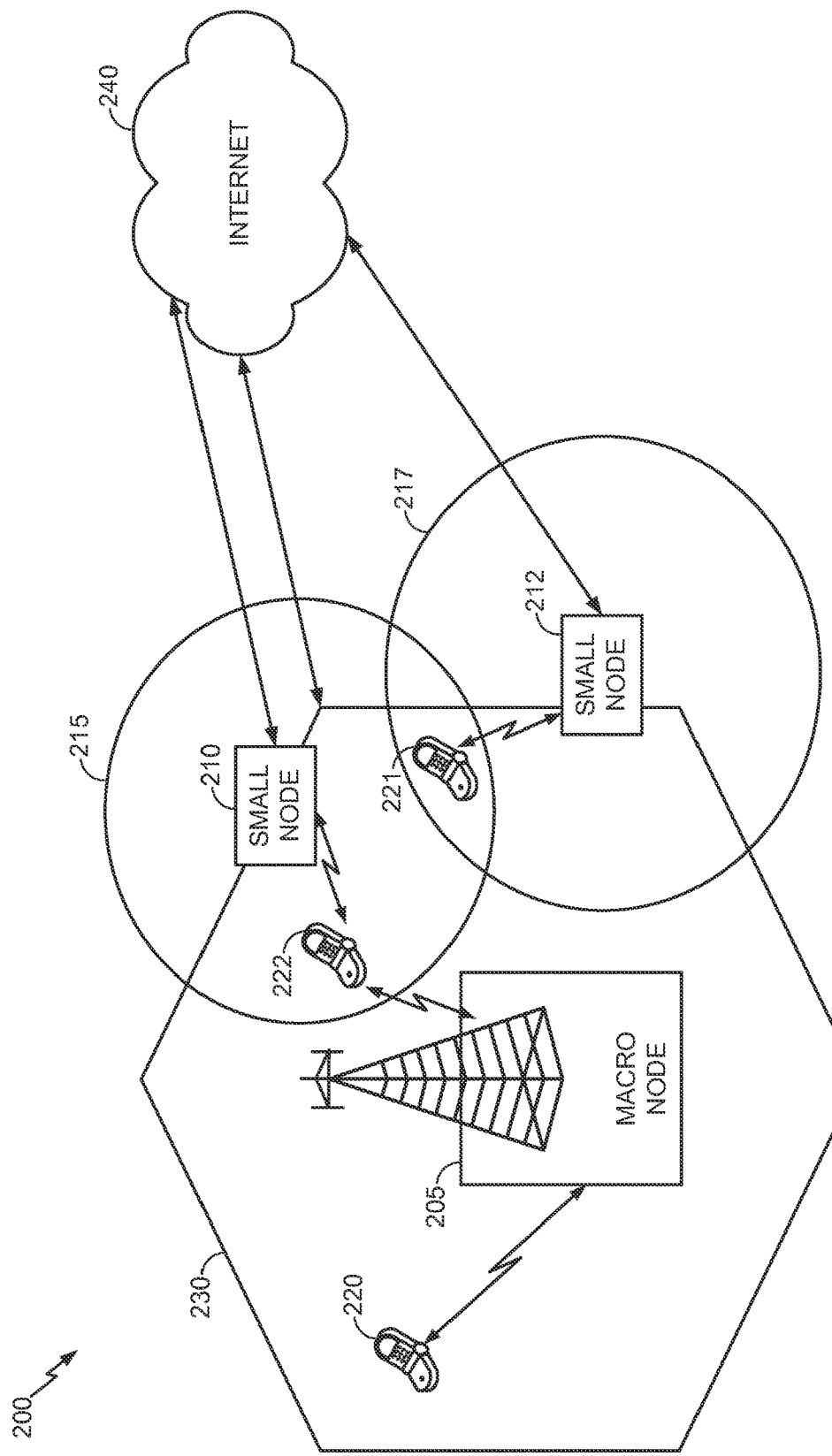
FIG. 2 illustrates an example mixed communication network environment.

FIG. 2 illustrates an example mixed communication network environment in which small cells are deployed in conjunction with macro cells. Here, a macro base station 205 may provide communication coverage to one or more user devices, such as the illustrated user devices 220, 221, and 222, within a macro area 230, while small cell base stations 210 and 212 may provide their own communication coverage within respective small cell areas 215 and 217, with varying degrees of overlap among the different coverage areas. In this example, at least some user devices, such as the illustrated user device 222, may be capable of operating both in macro environments (e.g., macro areas) and in smaller scale network environments (e.g., residential, small cell areas, pico areas, etc.). It will be appreciated that certain small cell nodes may be restricted in some manner, such as for association and/or registration, and that small cells may therefore be alternatively referred to as Closed Subscriber Group ("CSG") cells.

In the connections shown, the user device 220 may generate and transmit a message via a wireless link to the macro base station 205, the message including information related to various types of communication (e.g., voice, data, multimedia services, etc.). The user device 222 may similarly communicate with the small cell base station 210 via a wireless link, and the user device 221 may similarly communicate with the small cell base station 212 via a wireless link. The macro base station 205 may also communicate with a corresponding wide area or external network 240 (e.g., the Internet), via a wired link or via a wireless link, while the small cell base stations 210 and 212 may also similarly communicate with the network 240, via their own wired or wireless links. For example, the small cell base stations 210 and 212 may communicate with the network 240 by way of an Internet Protocol (IP) connection, such as via a digital subscriber line (DSL, e.g., including asymmetric DSL (ADSL), high data rate DSL (HDSL), very high speed DSL (VDSL), etc.), a TV cable carrying IP traffic, a broadband over power line (BPL) connection, an optical fiber (OF) link, or some other link.

The network 240 may comprise any type of electronically connected group of computers and/or devices, including, for example, the following networks: Internet, Intranet, Local Area Networks (LANs), or Wide Area Networks (WANs). In addition, the connectivity to the network may be, for example, by remote modem, Ethernet (IEEE 802.3), Token Ring (IEEE 802.5), Fiber Distributed Datalink Interface (FDDI) Asynchronous Transfer Mode (ATM), Wireless Ethernet (IEEE 802.11), Bluetooth (IEEE 802.15.1), or some other connection. As used herein, the network 240 includes network variations such as the public Internet, a private network within the Internet, a secure network within the Internet, a private network, a public network, a value-added network, an intranet, and the like. In certain systems, the network 240 may also comprise a virtual private network (VPN).

Accordingly, it will be appreciated that the macro base station 205 and/or either or both of the small cell base stations 210 and 212 may be connected to the network 240 using any of a multitude of devices or methods. These connections may be referred to as the "backbone" or the "backhaul" of the network. Devices such as a radio network controller (RNC), base station controller (BSC), or another device or system (not shown) may be used to manage communications between two or more macro base stations, pico base stations, and/or small cell base stations. In this way, depending on the current location of the user device 222, for example, the user device 222 may access the communication network 240 by the macro base station 205 or by the small cell base station 210.

For their respective wireless air interfaces, the macro base station 205 and the small cell base stations 210, 212 may operate according to one of several Radio Access Technologies (RATs) depending on the network in which they are deployed. These networks may include, for example, Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and so on. The terms "network" and "system" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). In addition, the macro base station 205 and the small cell base stations 210, 212 may operate on one or more of a plurality of designated frequencies within their respective RAT.

In different environments, the macro base station 205 and the small cell base stations 210, 212 may operate according to the same RAT or according to different RATs, as well as on the same frequency or on different frequencies. For example, when the macro base station 205 operates in accordance with a serving RAT X on a serving frequency A, the small cell base station 210 may operate (1) in accordance with the same serving RAT X and on the same serving frequency A, (2) in accordance with the same serving RAT X but on a different non-serving frequency B, (3) in accordance with a different non-serving RAT Y but on the same serving frequency A, or (4) in accordance with a different non-serving RAT Y and on a different non-serving frequency B. The small cell base station 212 may similarly operate under any of these RAT and frequency combinations, as well as others in accordance with a still different non-serving RAT Z and/or on a still different non-serving frequency C.

There are accordingly several potential cell reselection scenarios for a user device, such as the illustrated user device 222, attempting to identify a preferred small cell candidate for transitioning from macro cell coverage (e.g., as provided by the macro base station 205) to small cell coverage (e.g., as provided by one of the small cell base stations 210, 212). To facilitate cell reselection and identification of a preferred small cell candidate across different RATs (inter-RAT reselection) and across different frequencies (intra-RAT reselection, including both inter-frequency reselection on the serving frequency and intra-frequency reselection on non-serving frequencies), the present disclosure provides advanced reselection criteria covering these various scenarios. In this way, additional small cell reselection candidate options are made available to user devices.

Figure 3:
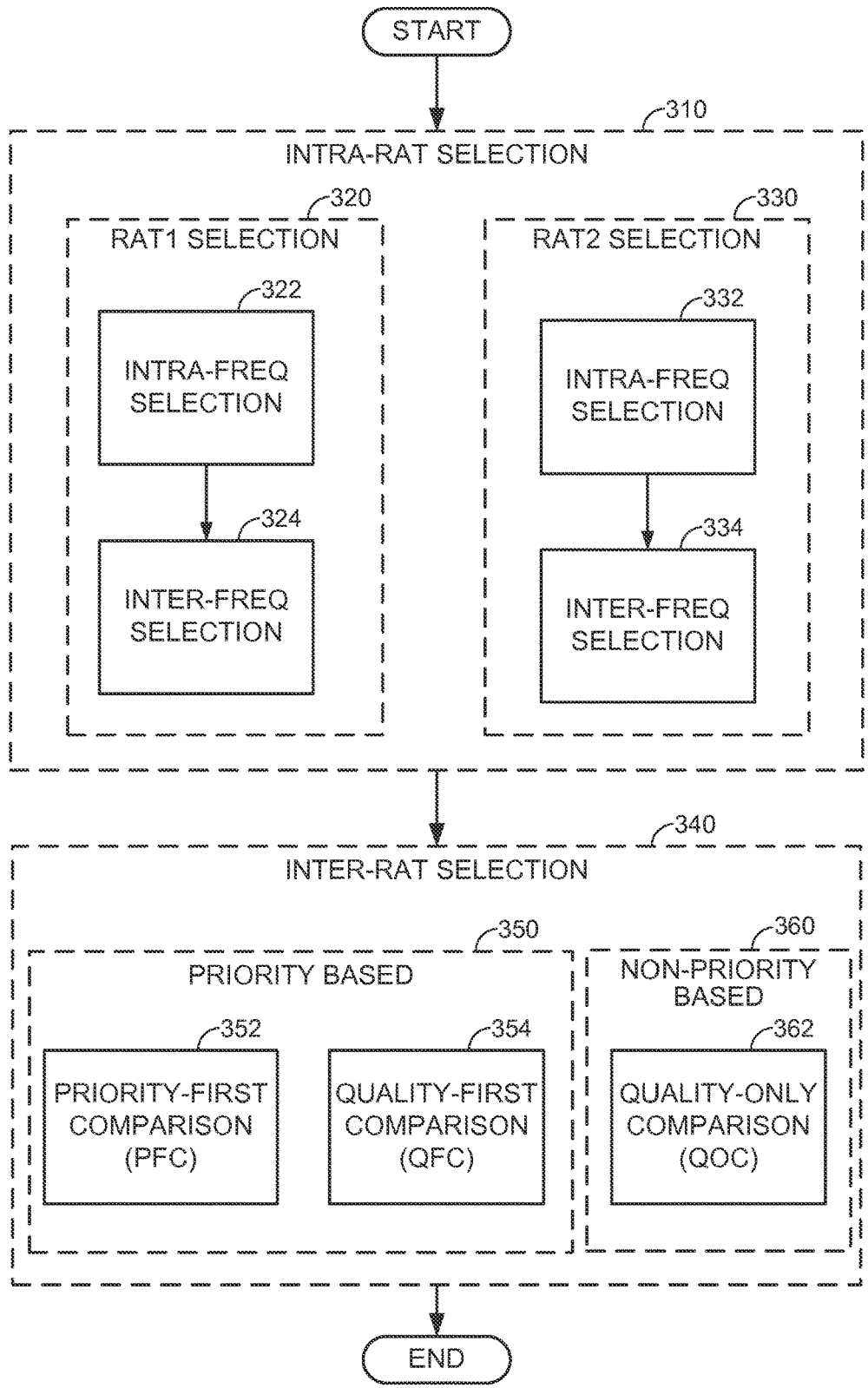
FIG. 3 is a flow diagram illustrating different cell reselection processes.

FIG. 3 is a flow diagram illustrating different cell reselection processes for transitioning a user device from a macro cell to a small cell. In general, a user device performing the cell reselection (e.g., the user device 222 in FIG. 2) may be configured to select a reselection candidate small cell for each available RAT via various intra-RAT selection procedures 310, and to compare the different reselection candidate small cells to determine a final reselection candidate via various inter-RAT selection procedures 340.

For the intra-RAT processing 310, the selection of a candidate within each RAT may be performed in different ways. Two example RATs are shown as being processed in FIG. 3, including RAT1 selection 320 and RAT2 selection 330, each including intra-frequency selection 322, 332 for selecting candidate cells within different operating frequencies and inter-frequency selection 324, 334 for selecting candidate cells between different operating frequencies. In general, the best (e.g., highest ranked or strongest) cell on each frequency within the RAT may be selected, and the selected cells for the different frequencies compared against each other based on certain intra-RAT reselection criteria. As generally used herein, the term "ranking" refers to certain procedures/methods defined by 3GPP standards (e.g., 3GPP TS 36.304 and 3GPP TS 25.304), and may be used to evaluate different cells operating on the same frequency. By contrast, the term "comparing" refers to evaluating candidate cells on different frequencies or different RATs according to the reselection criteria provided herein.

The intra-RAT reselection criteria may include priority information obtained, for example, from a System Information Block (SIB) broadcast by the user device's serving macro cell. For example, in UMTS, a UTRA priority information list, a GSM priority information list, and an E-UTRA frequency and priority information list may be obtained from SIB19. As another example, in LTE, an intra-frequency priority list may be obtained from SIB3, an inter-frequency priority information list may be obtained from SIB5, and an inter-RAT priority information list may be obtained from SIB6-8. Under other circumstances (e.g., if SIB information is not available), the intra-RAT reselection criteria may be based on other metrics (e.g., signal strength or other signal quality metrics) or on normal reselection rules defined for the RAT. To avoid undue interference from macro cells, if the best cell on a given frequency is not a small cell, it may be omitted from the reselection analysis. Thus, on each frequency, the user device may select one or zero reselection candidate small cells.

As an example, the user device may be camped on a UTRAN cell and identify one or more UMTS small cells operating on different frequencies in its vicinity. For all suitable cells on the serving frequency of its associated macro cell, if the best ranked cell is a small cell, the user device may select it as a candidate. For each non-serving frequency, if the strongest cell is a suitable small cell, it may also be selected as a candidate. In this way, one or zero candidates may be selected from each frequency, depending on whether the strongest cell on that frequency is a small cell. The different candidates may then be compared based on information from their SIBs, and the best one may be selected as the UMTS small candidate.

As another example, the user device may be camped on a UTRAN cell and identify one or more LTE small cells operating on different frequencies in its vicinity. For each E-UTRAN frequency, if the strongest cell (e.g., in terms of Reference Signal Received Power (RSRP)) is a suitable small cell, the user device may select it as a candidate. In this way, one or zero candidates may be selected from each frequency, depending on whether the strongest cell on that frequency is a small cell. The different candidates may then be compared based on RSRP, and the best one may be selected as the LTE candidate.

As another example, the user device may be camped on an E-UTRAN cell and identify one or more UMTS small cells operating on different frequencies in its vicinity. For each frequency (either serving or not), if the highest ranked cell is a suitable small cell, the user device may select it as a candidate. In this way, one or zero candidates may be selected from each frequency, depending on whether the strongest cell on that frequency is a small cell. The different candidates may then be compared based on information from their SIBs, and the best one may be selected as the LTE small candidate.

As another example, the user device may be camped on an E-UTRAN cell and identify one or more LTE small cells operating on different frequencies in its vicinity. For each UTRAN frequency, if the strongest cell (e.g., in terms of Common Pilot Channel (CPICH) $E_c/I_o$) is a suitable small cell, the user device may select it as a candidate. In this way, one or zero candidates may be selected from each frequency, depending on whether the strongest cell on that frequency is a small cell. The different candidates may then be compared based on CPICH $E_c/I_o$, and the best one may be selected as the UMTS candidate.

Returning to FIG. 3, for the inter-RAT processing 340, the selection of a final candidate between different RATs (e.g., as between a selected UMTS candidate and a selected LTE candidate) may also be performed in different ways, in accordance with different inter-RAT reselection criteria. Two general classes of comparison procedures are shown in FIG. 3, including a priority-based class 350 where the inter-RAT reselection criteria includes priority information and a non-priority-based class 360 where the inter-RAT reselection criteria does not include priority information. 3GPP standards, for example, include the concept of absolute priority to define reselection rules to compare UMTS and LTE cells. As noted above, absolute priority information can be obtained, for example, from one or more SIBs broadcast by the user device's serving macro cell. The corresponding reselection rules can be found in Section 5.2.6.1.4a in 3GPP TS 25.304, "User Equipment (UE) procedures in idle mode and procedures for cell reselection in connected mode," and Sections 5.2.4.5 and 5.2.4.6 in 3GPP TS 36.304, "Evolved Universal Terrestrial Radio Access (E-UTRA); User Equipment (UE) procedures in idle mode."

In either case, whether or not the inter-RAT reselection criteria includes priority information, the inter-RAT reselection criteria may include quality information (e.g., $E_c/I_o$, RSRP, Received Signal Code Power (RSCP), Reference Signal Received Quality (RSRQ), etc.) associated with the candidate cells. Depending on the distinct order in which to evaluate the reselection candidates, the priority-based class 350 of comparison procedures may be implemented according to a priority-first comparison (PFC) 352 or a quality-first comparison (QFC) 354. For the non-priority-based class 360 of comparison procedures, the user device may effectively disregard the priority information, in which case the PFC 352 and QFC 354 reduce down to a quality-only comparison (QOC) 362. In all of these designs, a randomized strategy may be introduced to avoid load imbalance if two cells end up with comparable quality or priority metrics. Example algorithms for each of these designs are detailed below.

Figure 4:
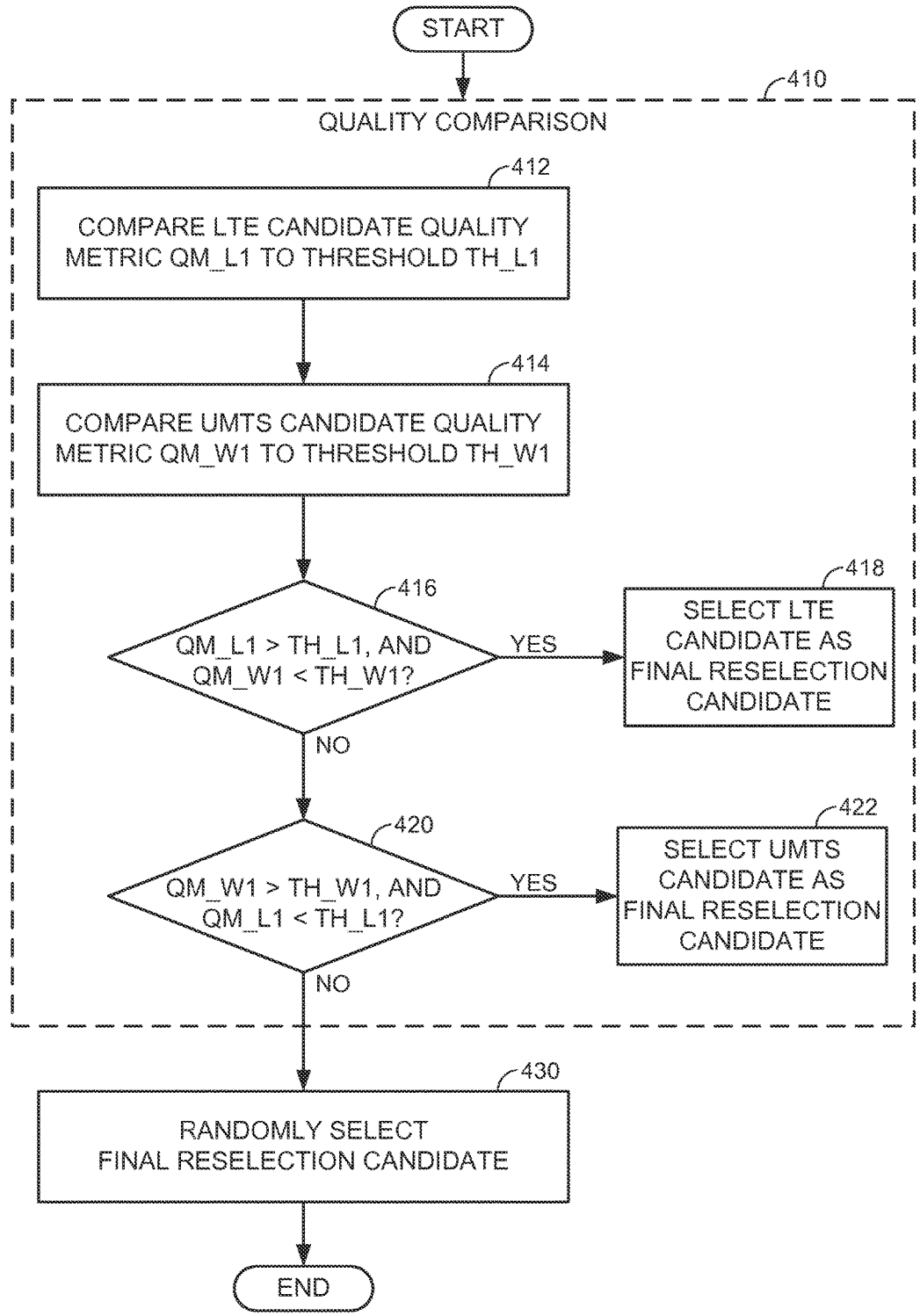
FIG. 4 is a flow diagram illustrating an example quality-only comparison algorithm for inter-RAT selection.

FIG. 4 is a flow diagram illustrating an example quality-only comparison algorithm for inter-RAT selection. Here, quality metrics for the different candidate cells may be evaluated by comparing against certain thresholds to determine if the cells are of sufficiently good quality for reselection. If a first candidate cell operating on a first RAT is of good quality and a second candidate cell operating on a second RAT is not, the first candidate cell may be selected. Otherwise, if both candidate cells have similar quality (either above or below their respective thresholds), one of the candidate cells may be randomly or pseudo-randomly selected to avoid load imbalance.

In more detail, the example of FIG. 4 illustrates a user device performing inter-RAT selection quality comparison processing (block 410) between an LTE candidate and a UMTS candidate by comparing the LTE candidate's quality metric (QM_L1) to a corresponding threshold (TH_L1) (block 412) and comparing the UMTS candidate's quality metric (QM_W1) to a corresponding threshold (TH_W1) (block 414). As an example, RSRP can be used as the quality metric for the LTE candidate and the threshold can be chosen as −80 dBm, or as −100 dBm in some designs. As another example, CPICH $E_c/I_o$ can be used as the quality metric for the UMTS candidate and the threshold can be chosen as −10 dB.

If the LTE candidate's quality metric is above its threshold and the UMTS candidate's quality metric is below its threshold ('yes' at decision 416), the LTE candidate is selected as the final reselection candidate (block 418). Alternatively ('no' at decision 416), if the UMTS candidate's quality metric is above its threshold and the LTE candidate's quality metric is below its threshold ('yes' at decision 420), the UMTS candidate is selected as the final reselection candidate (block 422).

Otherwise ('no' at decision 420), both candidates are deemed to have similar quality and the user device may randomly or pseudo-randomly select a final reselection candidate (block 430). As an example, the user device may select the LTE candidate with a probability P and the UMTS candidate with a probability 1-P, where 0≤P≤1. The parameter P can be fixed or tuned based on the cell loading for the LTE and the UMTS networks, or based on a network operator's preferences and policies. On the one extreme of "P=1," the user device will always select the LTE candidate and not the UMTS candidate, while on the opposite extreme of "P=0," the user device will always select the UMTS candidate and not the LTE candidate. Setting "P=0.5," for example, the user device will have equal probabilities to select the LTE and UMTS candidates.

Figure 5A:
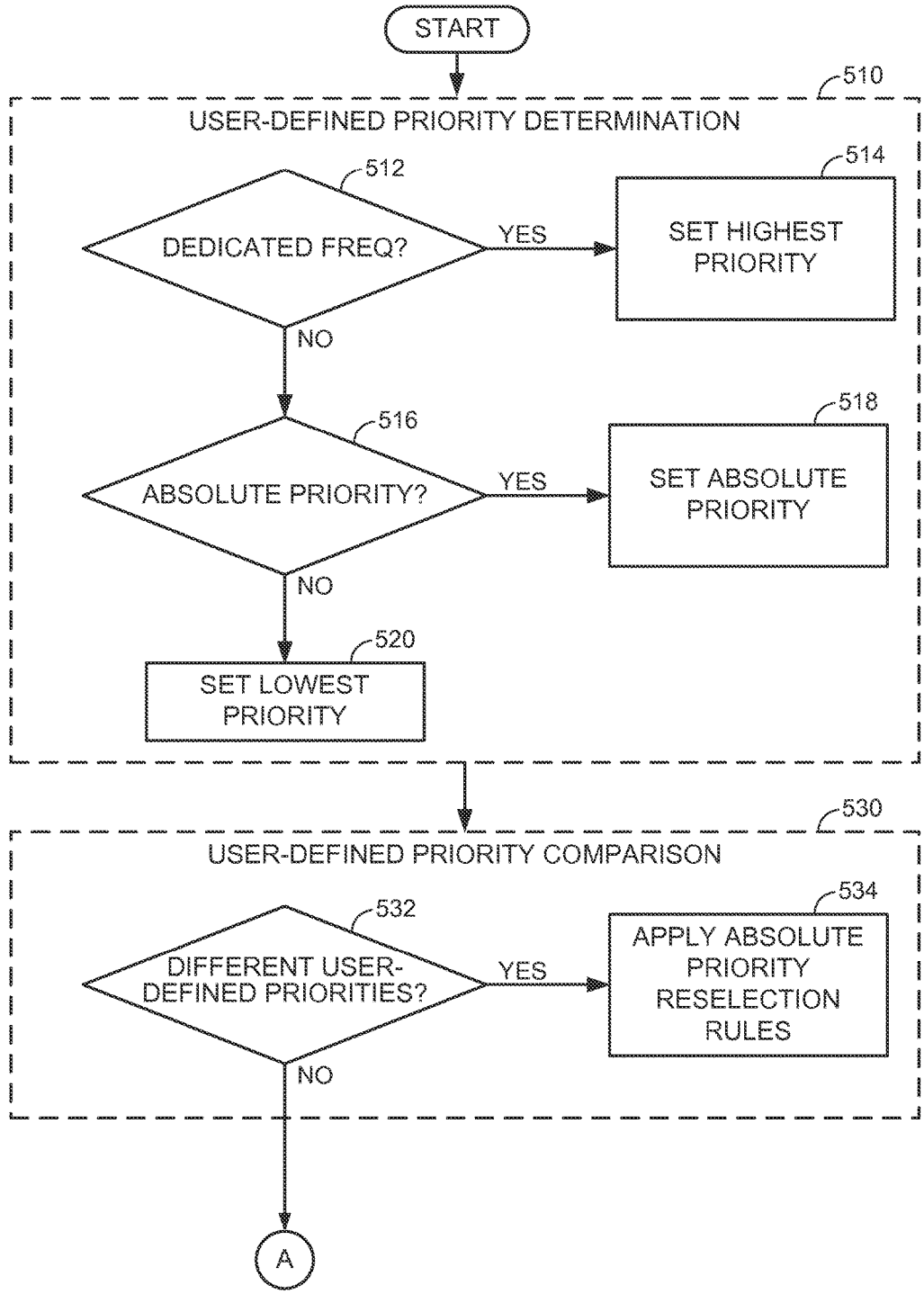
FIGS. 5A and 5B are respective sheets illustrating a flow diagram illustrating an example priority-first comparison algorithm for inter-RAT selection.
Figure 5B:
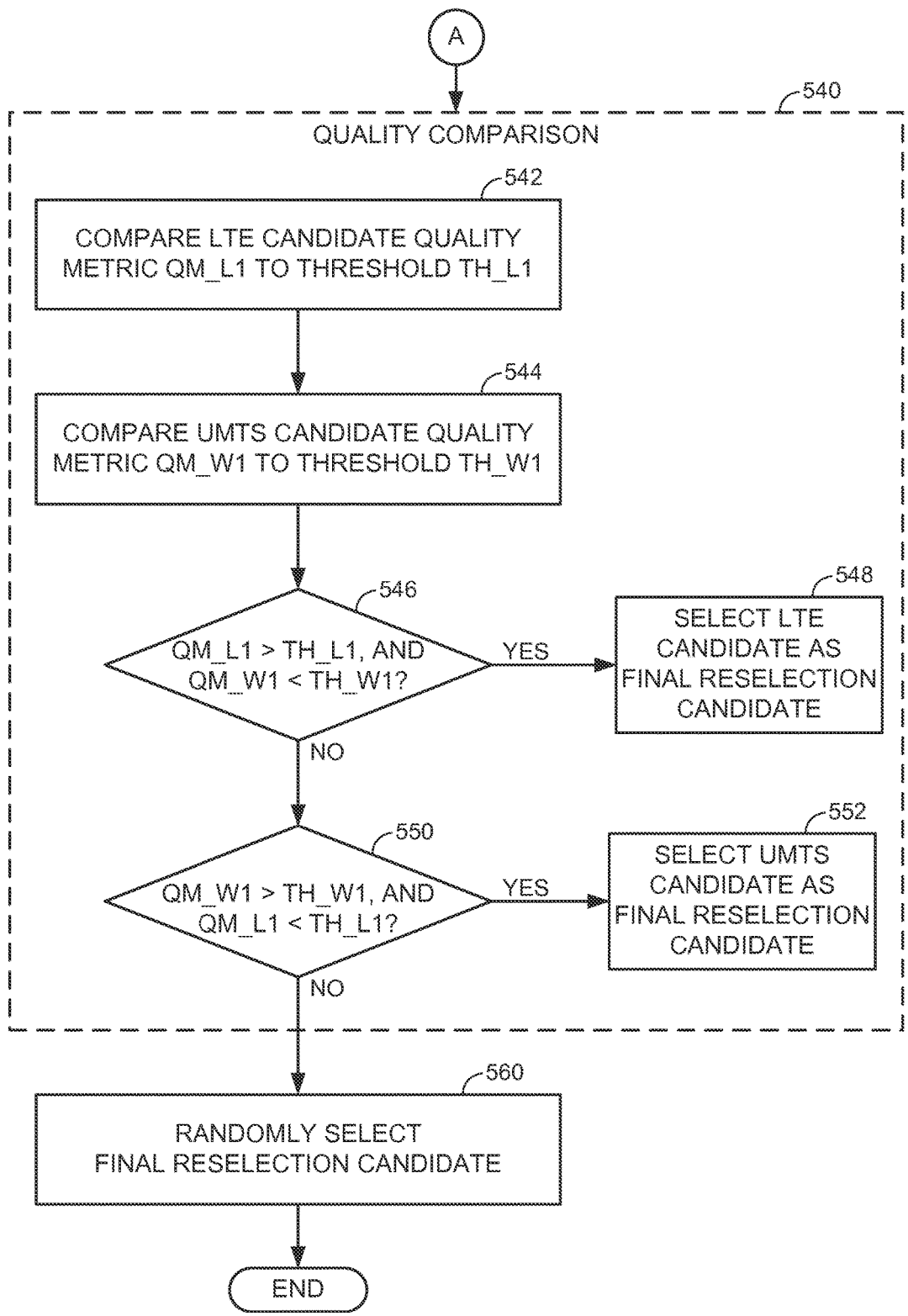

FIGS. 5A and 5B are respective sheets illustrating a flow diagram illustrating an example priority-first comparison algorithm for inter-RAT selection. Here, a user-defined priority may be determined based on absolute priority information and small cell dedicated frequency information, depending on availability. If two candidates have different user-defined priorities, absolute priority reselection rules for cell reselection may be applied. If two candidates have the same user-defined priority, the candidate cells' quality may be evaluated by comparing against certain thresholds to determine if these cells are of sufficiently good quality for reselection.

In more detail, the user-defined priority may be determined (block 510) as follows. If a dedicated small cell frequency is available and a candidate cell is operating on the dedicated frequency ('yes' at decision 512), it may be considered to have the highest user-defined priority (block 514). Ordinarily, the network is not expected to assign priority for small-cell-only layers, which may accordingly be made higher priority by default than any macro cell layers. Alternatively ('no' at decision 512), if absolute priority is assigned for the frequency associated with the candidate cell ('yes' at decision 516), the associated absolute priority is used to set the user-defined priority (block 518). Otherwise ('no' at decision 516), the candidate cell is set to the lowest priority (block 520).

Once set, the user-defined priorities for the different candidate cells may then be compared to each other to select the final reselection candidate (block 530). If the candidate cells have different user-defined priorities ('yes' at decision 532), the existing absolute priority reselection rules may be applied to select the final reselection candidate (block 534). As noted above, such absolute priority reselection rules can be found, for example, in Section 5.2.6.1.4a in 3GPP TS 25.304, "User Equipment (UE) procedures in idle mode and procedures for cell reselection in connected mode" if the user device is camped on a UTRAN cell, and in Sections 5.2.4.5 and 5.2.4.6 in 3GPP TS 36.304, "Evolved Universal Terrestrial Radio Access (E-UTRA); User Equipment (UE) procedures in idle mode" if the user device is camped on an E-UTRAN cell.

Otherwise, if the two candidate cells have the same user-defined priority ('no' at decision 532), the user device may initiate quality comparison processing (block 540). As detailed above with reference to FIG. 4, the quality comparison processing may include a user device performing inter-RAT selection processing between an LTE candidate and a UMTS candidate by comparing the LTE candidate's quality metric (QM_L1) to a corresponding threshold (TH_L1) (block 542) and comparing the UMTS candidate's quality metric (QM_W1) to a corresponding threshold (TH_W1) (block 544). If the LTE candidate's quality metric is above its threshold and the UMTS candidate's quality metric is below its threshold ('yes' at decision 546), the LTE candidate is selected as the final reselection candidate (block 548). Alternatively ('no' at decision 546), if the UMTS candidate's quality metric is above its threshold and the LTE candidate's quality metric is below its threshold ('yes' at decision 550), the UMTS candidate is selected as the final reselection candidate (block 552). Otherwise ('no' at decision 550), both candidates are deemed to have similar quality and the user device may randomly or pseudo-randomly select a final reselection candidate (block 560).

Figure 6A:
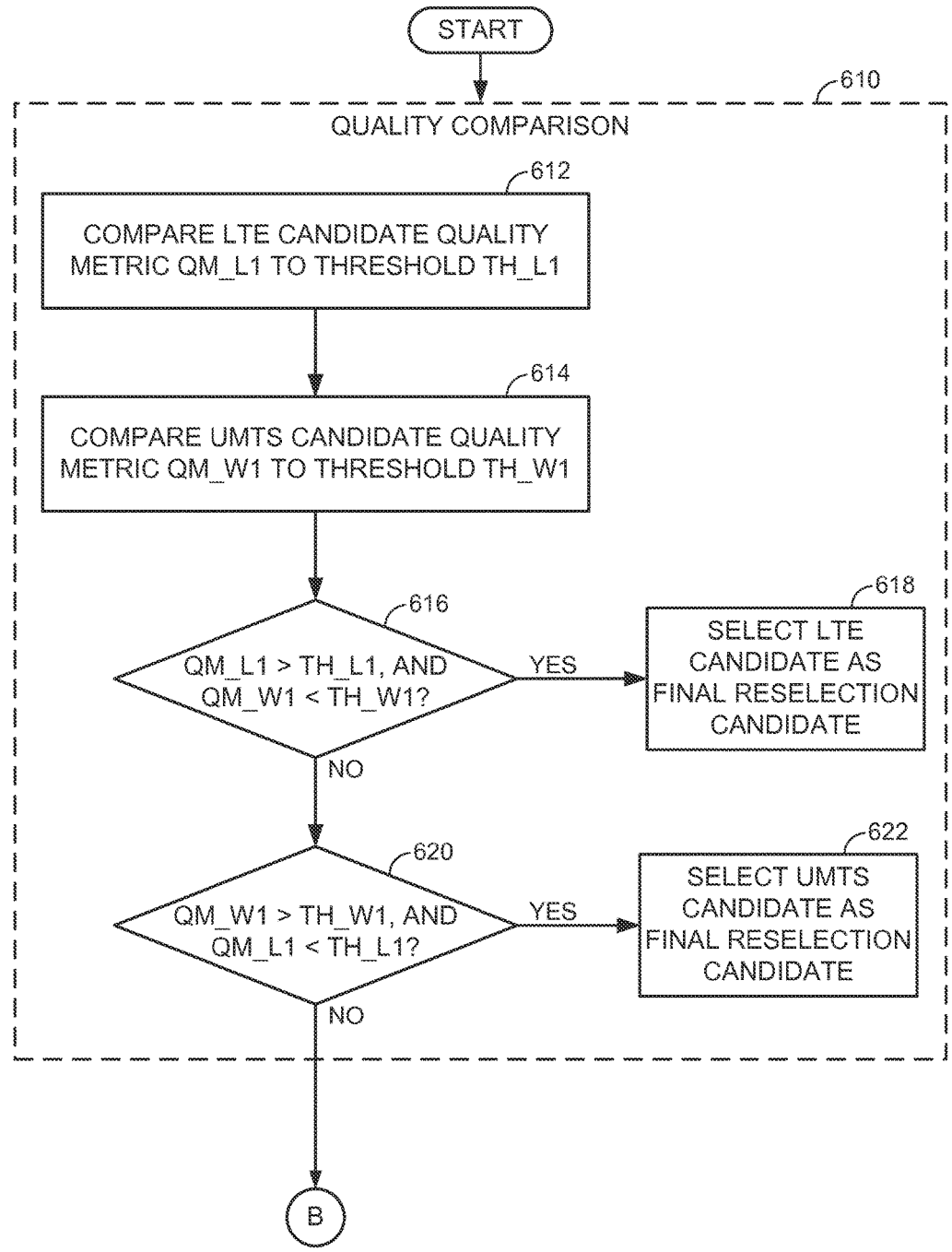
FIGS. 6A and 6B are respective sheets illustrating a flow diagram illustrating an example quality-first comparison algorithm for inter-RAT selection.
Figure 6B:
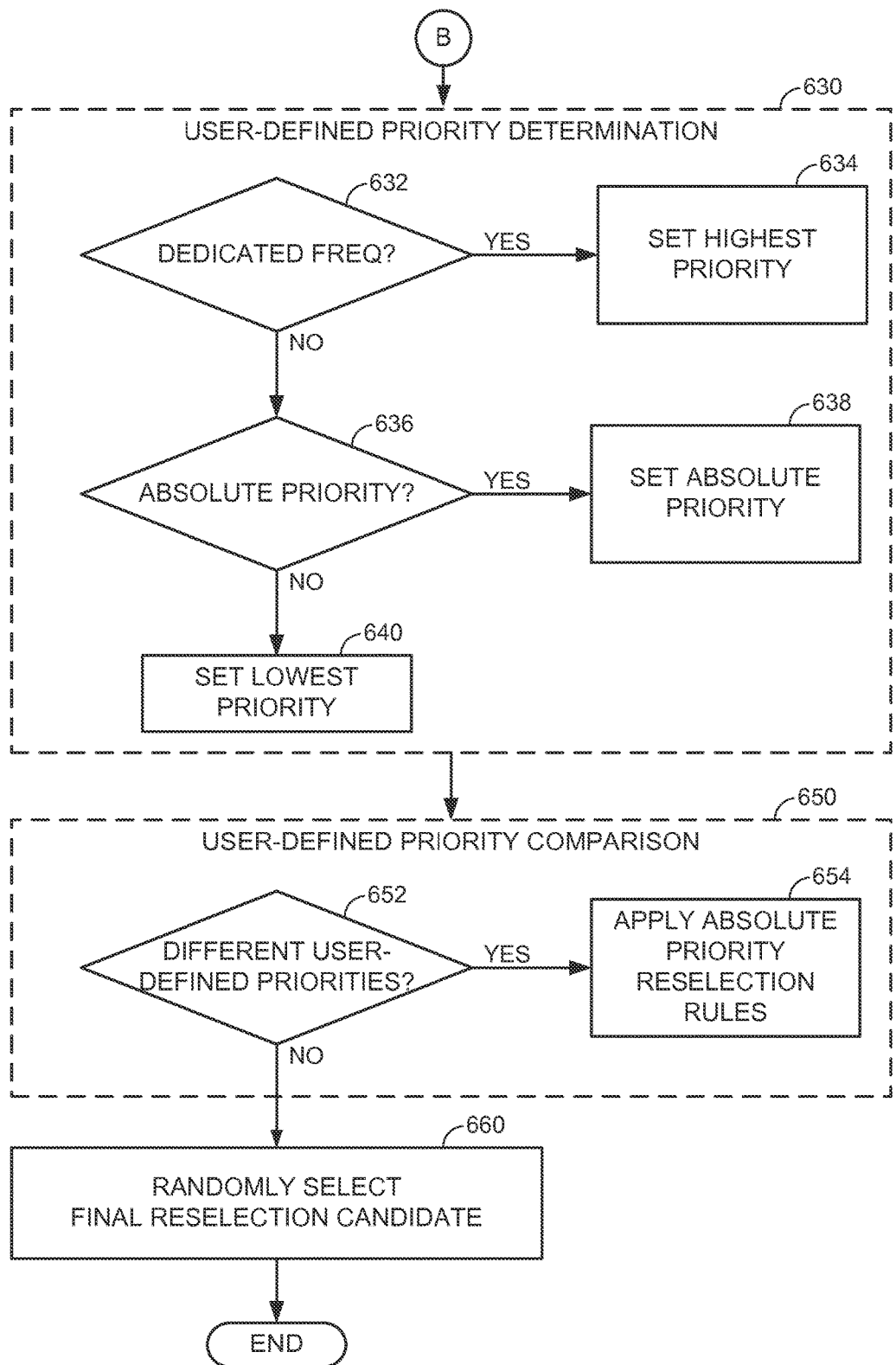

FIGS. 6A and 6B are respective sheets illustrating a flow diagram illustrating an example quality-first comparison algorithm for inter-RAT selection. Here, the candidate cells' quality may first be compared against certain thresholds to determine if these cells are of sufficiently good quality for reselection. If the cells have similar quality, their user-defined priorities may be determined and the candidate with higher user-defined priority selected as the final reselection candidate.

In more detail, the example of FIGS. 6A and 6B illustrates a user device performing inter-RAT selection quality comparison processing (block 610) between an LTE candidate and a UMTS candidate by comparing the LTE candidate's quality metric (QM_L1) to a corresponding threshold (TH_L1) (block 612) and comparing the UMTS candidate's quality metric (QM_W1) to a corresponding threshold (TH_W1) (block 614), as discussed above with reference to FIG. 4. If the LTE candidate's quality metric is above its threshold and the UMTS candidate's quality metric is below its threshold ('yes' at decision 616), the LTE candidate is selected as the final reselection candidate (block 618). Alternatively ('no' at decision 616), if the UMTS candidate's quality metric is above its threshold and the LTE candidate's quality metric is below its threshold ('yes' at decision 620), the UMTS candidate is selected as the final reselection candidate (block 622).

Otherwise ('no' at decision 620), a user-defined priority may be determined (block 630) as follows, as discussed above with reference to FIGS. 5A and 5B. If a dedicated small cell frequency is available and a candidate cell is operating on the dedicated frequency ('yes' at decision 632), it may be considered to have the highest user-defined priority (block 634). Ordinarily, the network is not expected to assign priority for small-cell-only layers, which may accordingly be made a higher priority by default than any macro cell layers. Alternatively ('no' at decision 632), if absolute priority is assigned for the frequency associated with the candidate cell ('yes' at decision 636), the associated absolute priority is used to set the user-defined priority (block 638). Otherwise ('no' at decision 636), the candidate cell is set to the lowest priority (block 640).

Once set, the user-defined priorities for the different candidate cells may then be compared to each other to select the final reselection candidate (block 650). If the candidate cells have different user-defined priorities ('yes' at decision 652), the existing absolute priority reselection rules may be applied to select the final reselection candidate (block 654). Otherwise ('no' at decision 652), both candidates are deemed to have similar quality and the user device may randomly or pseudo-randomly select a final reselection candidate (block 660).

Figure 7:
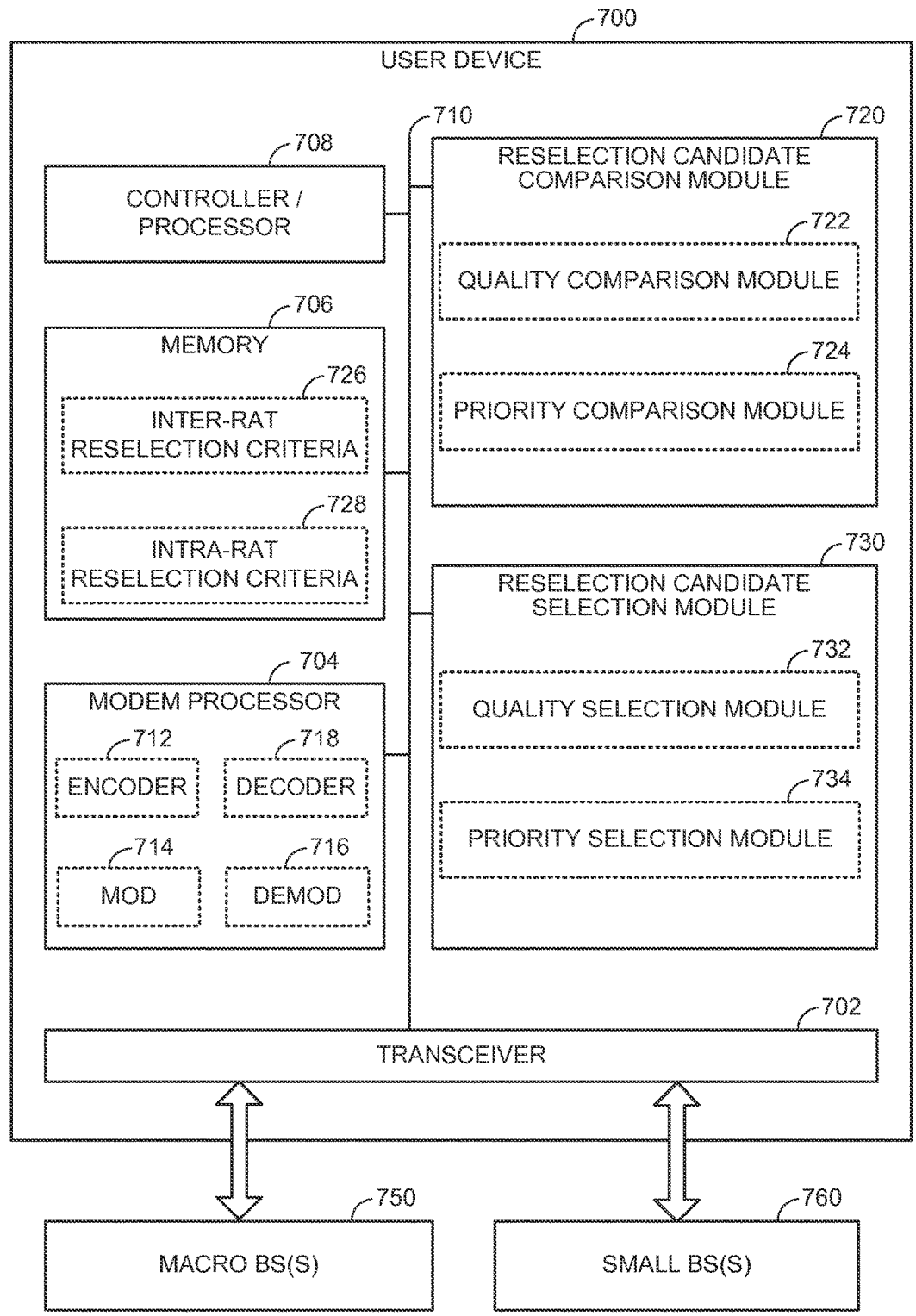
FIG. 7 illustrates an example of a user device configured to support cell reselection.

FIG. 7 illustrates an example of a user device configured to support cell reselection for transitioning the user device from a macro cell to a small cell. As shown, the illustrated user device 700 may generally include various hardware components for communicating with one or more macro base stations 750 and one or more small cell base stations 760 according to their respective RATs and on their respective operating frequencies.

On the transmit path, traffic data to be sent by the user device 700 may be processed (e.g., formatted, encoded, and interleaved) by an encoder 712 and further processed (e.g., modulated, channelized, and scrambled) by a modulator (Mod) 714 in accordance with the applicable RAT to generate an output signal. A transceiver 702 may then condition (e.g., convert to analog, filter, amplify, and upconvert) the output signal in accordance with the applicable operating frequency and transmit it via one or more associated antennas. On the receive path, the transceiver 702 may receive signals transmitted from the illustrated wireless systems. The transceiver 702 may then condition (e.g., filter, amplify, downconvert, and digitize) the received signal and provide samples. A demodulator (Demod) 716 may process (e.g., descramble, channelize, and demodulate) the samples and provide symbol estimates. A decoder 718 may further process (e.g., deinterleave and decode) the symbol estimates and provide decoded data.

The encoder 712, modulator 714, demodulator 716, and decoder 718 may form a modem processor 704, as shown. The user device 700 may also include one or more general purpose controllers or processors (illustrated in the singular as the controller/processor 708) and memory 706 configured to store related data or instructions. Together, via a bus 710, these units may perform processing in accordance with the appropriate RATs and on the appropriate frequencies used for communication, as well as other functions for the user device 700.

To facilitate cell reselection and identification of a preferred reselection candidate small cell, the user device 700 further includes a reselection candidate comparison module 720 and a reselection candidate selection module 730. During operation, the user device 700 may be in communication with or otherwise camped on the macro cell provided by the macro base station 750 in accordance with a serving RAT and on a serving frequency. The user device 700 may nevertheless scan (on a periodic or event-driven basis) the available systems in its current environment to identify one or more potential reselection candidate small cells provided by the one or more small cell base stations 760 for cell reselection. Upon discovery of multiple potential reselection candidate small cells, the user device 700 may invoke the reselection candidate comparison module 720 to compare different (e.g., first and second) reselection candidate small cells based on certain reselection criteria, and invoke the reselection candidate selection module 730 to select a final reselection candidate based on the comparison.

For intra-RAT selection, the different reselection candidate small cells may operate on different frequencies of the same RAT, with the reselection criteria corresponding to intra-RAT reselection criteria (e.g., the intra-RAT reselection criteria 726 stored in the memory 706 as shown). The intra-RAT reselection criteria may include, for example, a signal quality metric (e.g., $E_c/I_o$, RSRP, RSCP, RSRQ, etc.) for each of the reselection candidate small cells. In this way, the small cell with the highest signal quality may be selected as the final reselection candidate.

For inter-RAT selection, the different reselection candidate small cells may operate in accordance with different RATs, with the reselection criteria corresponding to inter-RAT reselection criteria (e.g., the inter-RAT reselection criteria 728 stored in the memory 706 as shown). The inter-RAT reselection criteria may include, for example, a quality metric and corresponding threshold for each of the different reselection candidate small cells. In this example, the reselection candidate comparison module 720 may include a quality comparison module 722 configured to compare the quality metrics of the different reselection candidate small cells to the corresponding thresholds.

The reselection candidate selection module 730 may also include a quality selection module 732. The quality selection module 732 may be configured to select the first reselection candidate small cell as the final reselection candidate if (i) the quality metric for a first reselection candidate small cell is above the corresponding threshold for the first reselection candidate small cell and (ii) the quality metric for a second reselection candidate small cell is below the corresponding threshold for the second reselection candidate small cell. The quality selection module 732 may be further configured to select the second reselection candidate small cell as the final reselection candidate if (i) the quality metric for the second reselection candidate small cell is above the corresponding threshold for the second reselection candidate small cell and (ii) the quality metric for the first reselection candidate small cell is below the corresponding threshold for the first reselection candidate small cell. The quality selection module 732 may be still further configured to randomly select one of the first or second reselection candidate small cells as the final reselection candidate if (i) the quality metric for the first reselection candidate small cell is below the corresponding threshold for the first reselection candidate small cell and (ii) the quality metric for the second reselection candidate small cell is below the corresponding threshold for the second reselection candidate small cell. The randomly selecting may be based, for example, on a dynamically adjustable probability associated with relative network loading between the first and second reselection candidate small cells.

The inter-RAT reselection criteria may further include priority information for each of the reselection candidate small cells. Here, the reselection candidate comparison module 720 may include a priority comparison module 724 configured to set a user-defined priority for each of the reselection candidate small cells and compare the user-defined priorities. For example, for each of the reselection candidate small cells, the priority comparison module 724 may be configured to set a relatively high priority for the small cell if the small cell is identified as operating on a dedicated small cell frequency. The priority comparison module 724 may be further configured to set a relatively low priority for the small cell if (i) the small cell is not identified as operating on a dedicated small cell frequency and (ii) absolute priority information is not available for the small cell. The priority comparison module 724 may be still further configured to set an intermediate priority for the small cell based on absolute priority information if the absolute priority information is available for the small cell.

For a priority-first comparison algorithm, the reselection candidate comparison module 720 may be configured to compare the quality metrics of the different reselection candidate small cells to the corresponding thresholds in response to the user-defined priorities for the reselection candidate small cells being equal. For a quality-first comparison algorithm, the reselection candidate comparison module 720 may be configured to compare the user-defined priorities in response to the quality metrics of the different reselection candidate small cells being both above or both below the corresponding thresholds.

It will be appreciated that, in some designs, the functionality of the reselection candidate comparison module 720 and/or the reselection candidate selection module 730 may be integrated directly into, or otherwise performed by, the general purpose controller/processor 708 of the user device 700, in conjunction with the memory 706 as appropriate. In either case, the intra-RAT and inter-RAT processing may be performed in different ways, as discussed in more detail above in the context of the illustrated flow diagram(s).

Figure 8:
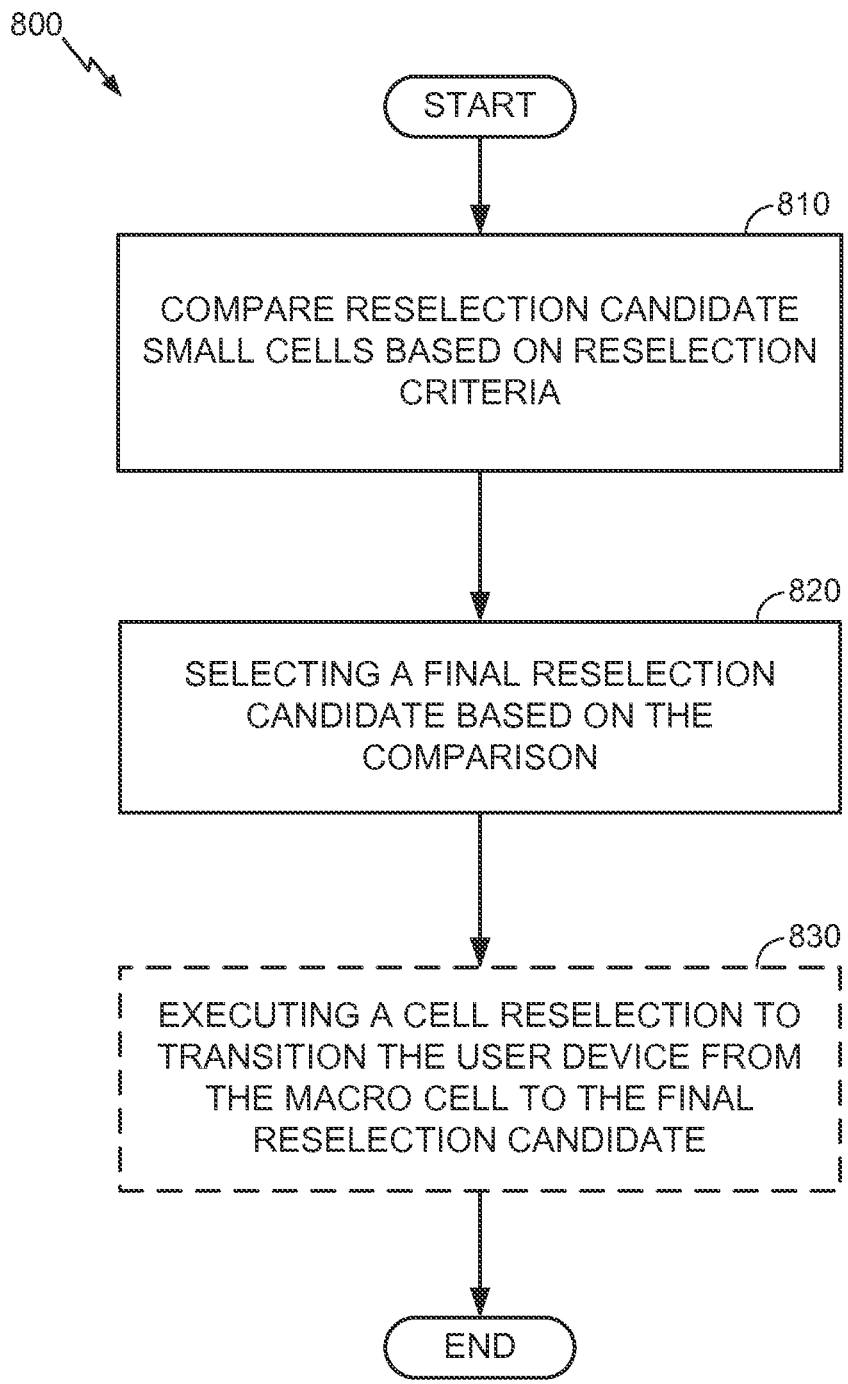
FIG. 8 is a flow diagram illustrating an example method of cell reselection.

FIG. 8 is a flow diagram illustrating an example method of cell reselection for transitioning a user device from a macro cell to a small cell. As shown, the method 800 may include comparing a first reselection candidate small cell and a second reselection candidate small cell based on reselection criteria (block 810) and selecting a final reselection candidate based on the comparison (block 820). The method 800 may also include executing a cell reselection to transition the user device from the macro cell to the selected final reselection candidate (optional block 830).

For intra-RAT selection, the first and second reselection candidate small cells may operate on different frequencies of the same RAT, with the reselection criteria corresponding to intra-RAT reselection criteria. The intra-RAT reselection criteria may include, for example, a signal quality metric (e.g., $E_c/I_o$, RSRP, RSCP, RSRQ, etc.) for each of the first and second reselection candidate small cells. In this way, the small cell with the highest signal quality may be selected as the final reselection candidate.

For inter-RAT selection, the first and second reselection candidate small cells may operate in accordance with different RATs, with the reselection criteria corresponding to inter-RAT reselection criteria. The inter-RAT reselection criteria may include, for example, a quality metric and corresponding threshold for each of the first and second reselection candidate small cells. In this example, the comparing may include comparing the quality metrics of the first and second reselection candidate small cells to the corresponding thresholds.

The selecting may include, for example, selecting the first reselection candidate small cell as the final reselection candidate if (i) the quality metric for the first reselection candidate small cell is above the corresponding threshold for the first reselection candidate small cell and (ii) the quality metric for the second reselection candidate small cell is below the corresponding threshold for the second reselection candidate small cell. The selecting may further include, for example, selecting the second reselection candidate small cell as the final reselection candidate if (i) the quality metric for the second reselection candidate small cell is above the corresponding threshold for the second reselection candidate small cell and (ii) the quality metric for the first reselection candidate small cell is below the corresponding threshold for the first reselection candidate small cell. The selecting may still further include, for example, randomly selecting one of the first or second reselection candidate small cells as the final reselection candidate if (i) the quality metric for the first reselection candidate small cell is below the corresponding threshold for the first reselection candidate small cell and (ii) the quality metric for the second reselection candidate small cell is below the corresponding threshold for the second reselection candidate small cell. The randomly selecting may be based, for example, on a dynamically adjustable probability associated with relative network loading between the first and second reselection candidate small cells.

The inter-RAT reselection criteria may further include priority information for each of the first and second reselection candidate small cells. Here, the comparing may include setting a user-defined priority for each of the first and second reselection candidate small cells, and comparing the user-defined priorities. For example, for each of the first and second reselection candidate small cells, the setting of the priority level may include setting a relatively high priority for the small cell if the small cell is identified as operating on a dedicated small cell frequency. The setting may further include setting a relatively low priority for the small cell if (i) the small cell is not identified as operating on a dedicated small cell frequency and (ii) absolute priority information is not available for the small cell. The setting may further include setting an intermediate priority for the small cell based on absolute priority information if the absolute priority information is available for the small cell.

For a priority-first comparison algorithm, comparing the quality metrics of the first and second reselection candidate small cells to the corresponding thresholds may be performed in response to the user-defined priorities being equal. For a quality-first comparison algorithm, comparing the user-defined priorities may be performed in response to the quality metrics of the first and second reselection candidate small cells being both above or both below the corresponding thresholds.

In the example of FIG. 8, the first reselection candidate small cell may operate in accordance with a RAT that is associated with one of LTE or UMTS, and the second reselection candidate small cell may also operate in accordance with a RAT that is associated with one of LTE or UMTS, for example.

Figure 9:
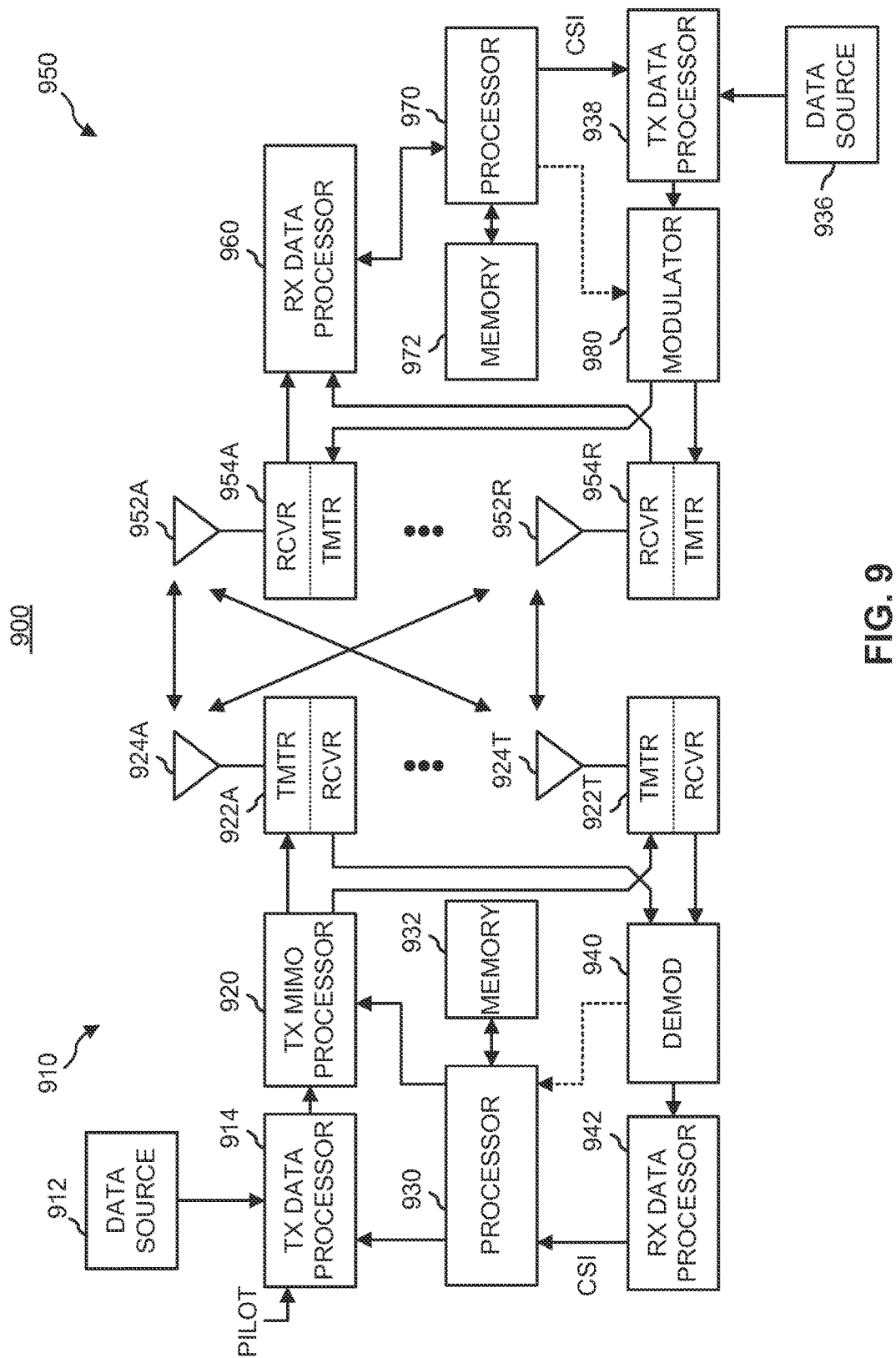
FIG. 9 illustrates another example wireless communication system.

FIG. 9 illustrates in more detail the principles of wireless communication between a wireless device 910 (e.g., a base station) and a wireless device 950 (e.g., a user device) of a sample communication system 900 that may be adapted as described herein. At the device 910, traffic data for a number of data streams is provided from a data source 912 to a transmit (TX) data processor 914. Each data stream may then be transmitted over a respective transmit antenna.

The TX data processor 914 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 930. A data memory 932 may store program code, data, and other information used by the processor 930 or other components of the device 910.

The modulation symbols for all data streams are then provided to a TX MIMO processor 920, which may further process the modulation symbols (e.g., for OFDM). The TX MIMO processor 920 then provides NT modulation symbol streams to NT transceivers (XCVR) 922A through 922T. In some aspects, the TX MIMO processor 920 applies beamforming weights to the symbols of the data streams and to the antenna from which the symbol is being transmitted.

Each transceiver 922 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 922A through 922T are then transmitted from NT antennas 924A through 924T, respectively.

At the device 950, the transmitted modulated signals are received by NR antennas 952A through 952R and the received signal from each antenna 952 is provided to a respective transceiver (XCVR) 954A through 954R. Each transceiver 954 conditions (e.g., filters, amplifies, and downconverts) a respective received signal, digitizes the conditioned signal to provide samples, and further processes the samples to provide a corresponding "received" symbol stream.

A receive (RX) data processor 960 then receives and processes the NR received symbol streams from NR transceivers 954 based on a particular receiver processing technique to provide NT "detected" symbol streams. The RX data processor 960 then demodulates, deinterleaves, and decodes each detected symbol stream to recover the traffic data for the data stream. The processing by the RX data processor 960 is complementary to that performed by the TX MIMO processor 920 and the TX data processor 914 at the device 910.

A processor 970 periodically determines which pre-coding matrix to use (discussed below). The processor 970 formulates a reverse link message comprising a matrix index portion and a rank value portion. A data memory 972 may store program code, data, and other information used by the processor 970 or other components of the device 950.

The reverse link message may comprise various types of information regarding the communication link and/or the received data stream. The reverse link message is then processed by a TX data processor 938, which also receives traffic data for a number of data streams from a data source 936, modulated by a modulator 980, conditioned by the transceivers 954A through 954R, and transmitted back to the device 910.

At the device 910, the modulated signals from the device 950 are received by the antennas 924, conditioned by the transceivers 922, demodulated by a demodulator (DEMOD) 940, and processed by a RX data processor 942 to extract the reverse link message transmitted by the device 950. The processor 930 then determines which pre-coding matrix to use for determining the beam-forming weights then processes the extracted message.

It will be appreciated that for each device 910 and 950 the functionality of two or more of the described components may be provided by a single component. It will be also be appreciated that the various communication components illustrated in FIG. 9 and described above may be further configured as appropriate to perform inter-RAT and intra-RAT small cell reselection as taught herein. For example, the processor 970 may cooperate with the memory 972 and/or other components of the device 950 to perform the inter-RAT and intra-RAT small cell reselection as taught herein.

Figure 10:
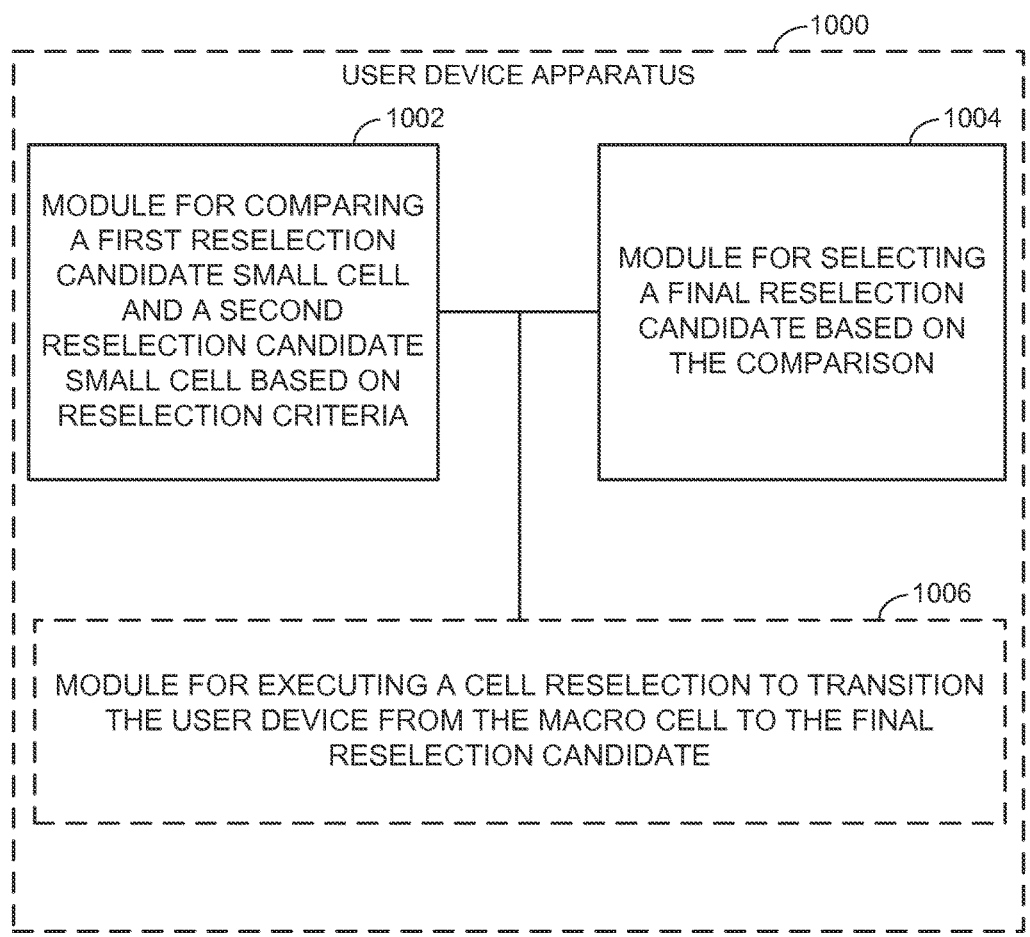
FIG. 10 illustrates an example user device apparatus represented as a series of interrelated functional modules.

FIG. 10 illustrates an example user device apparatus 1000 represented as a series of interrelated functional modules. A module for comparing 1002 may correspond at least in some aspects to, for example, a processing system as discussed herein. A module for selecting 1004 may correspond at least in some aspects to, for example, a processing system as discussed herein. A module for executing 1006 may correspond at least in some aspects to, for example, a communication device as discussed herein.

The functionality of the modules of FIG. 10 may be implemented in various ways consistent with the teachings herein. In some aspects, the functionality of these modules may be implemented as one or more electrical components. In some aspects, the functionality of these blocks may be implemented as a processing system including one or more processor components. In some aspects, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module.

In addition, the components and functions represented by FIG. 10 as well as other components and functions described herein, may be implemented using any suitable means. Such means also may be implemented, at least in part, using corresponding structure as taught herein. For example, the components described above in conjunction with the "module for" components of FIG. 10 also may correspond to similarly designated "means for" functionality. Thus, in some aspects one or more of such means may be implemented using one or more of processor components, integrated circuits, or other suitable structure as taught herein.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect disclosed can include a computer readable media embodying a method for inter-RAT and intra-RAT small cell reselection. Accordingly, the invention is not limited to illustrated examples and any means for performing the functionality described herein are included in aspects disclosed.

While the foregoing disclosure shows illustrative aspects disclosed, it should be noted that various changes and modifications could be made herein without departing from the scope of the invention as defined by the appended claims. The functions, steps and/or actions of the method claims in accordance with the aspects described herein need not be performed in any particular order. Furthermore, although elements disclosed may be described or claimed in the singular, the plural is contemplated unless limitation to the singular is explicitly stated.

What is claimed is:

1. A method of cell reselection for transitioning a user device from a macro cell to a small cell, comprising:
    comparing among a plurality of reselection candidate small cells having overlapping coverage areas based on reselection criteria, the plurality of reselection candidate small cells including first and second reselection candidate small cells, wherein
        when the first and second reselection candidate small cells respectively operate in accordance with first and second cellular Radio Access Technologies (RATs) different from each other and the reselection criteria corresponds to inter-RAT reselection criteria,
        the inter-RAT reselection criteria prioritizes the first reselection candidate small cell over the second reselection candidate small cell when it is determined that the first reselection candidate small cell operates on a dedicated small cell frequency of the first cellular RAT that is not shared with macro cells of the first cellular RAT and the second reselection candidate small cell operates on a small cell frequency of the second cellular RAT shared with macro cells of the second cellular RAT;
    selecting one of the first and second reselection candidate small cells as a final reselection candidate small cell based on the comparison; and
    executing a cell reselection to transition the user device from the macro cell to the final reselection candidate small cell.

2. The method of claim 1,
    wherein the inter-RAT reselection criteria comprises a quality metric and a corresponding threshold for each of the first and second reselection candidate small cells, the comparing comprising comparing the quality metrics of the first and second reselection candidate small cells to the corresponding thresholds.

3. The method of claim 2, wherein the selecting comprises:
    selecting the first reselection candidate small cell as the final reselection candidate small cell if
        (i) the quality metric for the first reselection candidate small cell is above the corresponding threshold for the first reselection candidate small cell and
        (ii) the quality metric for the second reselection candidate small cell is below the corresponding threshold for the second reselection candidate small cell;
    selecting the second reselection candidate small cell as the final reselection candidate small cell if
        (i) the quality metric for the second reselection candidate small cell is above the corresponding threshold for the second reselection candidate small cell and
        (ii) the quality metric for the first reselection candidate small cell is below the corresponding threshold for the first reselection candidate small cell; and
    randomly selecting one of the first and second reselection candidate small cells as the final reselection candidate small cell if
        (i) the quality metric for the first reselection candidate small cell is below the corresponding threshold for the first reselection candidate small cell and
        (ii) the quality metric for the second reselection candidate small cell is below the corresponding threshold for the second reselection candidate small cell.

4. The method of claim 3, wherein the randomly selecting is based on a dynamically adjustable probability associated with relative network loading between the first and second reselection candidate small cells.

5. The method of claim 2,
    wherein the inter-RAT reselection criteria further comprises priority information for each of the first and second reselection candidate small cells,
    the comparing further comprising:
        setting a user-defined priority for each of the first and second reselection candidate small cells; and
        comparing the user-defined priorities.

6. The method of claim 5, wherein the setting comprises, for each of the first and second reselection candidate small cells:
    setting a high priority for that small cell if that small cell is identified as operating on the dedicated small cell frequency of the RAT of that small cell;
    setting a low priority for that small cell if
        (i) that small cell is not identified as operating on the dedicated small cell frequency of the RAT of that small cell, and
        (ii) absolute priority information is not available for that small cell; and
    setting an intermediate priority for that small cell based on absolute priority information if the absolute priority information is available for that small cell,
    wherein for each of the first and second reselection candidate small cells, an order of priority from highest to lowest is the high priority, the intermediate priority, and the low priority.

7. The method of claim 5, wherein comparing the quality metrics of the first and second reselection candidate small cells to the corresponding thresholds is performed in response to the user-defined priorities being equal.

8. The method of claim 5, wherein comparing the user-defined priorities is performed in response to the quality metrics of the first and second reselection candidate small cells being both above or both below the corresponding thresholds.

9. The method of claim 1,
wherein the first reselection candidate small cell operates in accordance with a RAT that is associated with one of Long Term Evolution (LTE) or Universal Mobile Telecommunication System (UMTS), and
wherein the second reselection candidate small cell operates in accordance with a RAT that is associated with the other one of LTE or UMTS.

10. The method of claim 2, wherein the selecting comprises randomly selecting one of the first and second reselection candidate small cells as the final reselection candidate small cell if
(i) the quality metric for the first reselection candidate small cell is above the corresponding threshold for the first reselection candidate small cell, and
(ii) the quality metric for the second reselection candidate small cell is above the corresponding threshold for the second reselection candidate small cell.

11. The method of claim 1,
wherein the inter-RAT reselection criteria comprises priority information for each of the first and second reselection candidate small cells,
wherein the comparing comprises:
setting a user-defined priority for each of the first and second reselection candidate small cells; and
comparing the user-defined priorities, and
wherein selecting comprises randomly selecting one of the first and second reselection candidate small cells as the final reselection candidate small cell when the user-defined priorities of the first or second reselection candidate small cells are not different.

12. An apparatus for cell reselection to transition a user device from a macro cell to a small cell, comprising:
a processor configured to compare among a plurality of reselection candidate small cells having overlapping coverage areas based on reselection criteria, the plurality of reselection candidate small cells including first and second reselection candidate small cells, wherein when the first and second reselection candidate small cells respectively operate in accordance with first and second cellular Radio Access Technologies (RATs) different from each other and the reselection criteria corresponds to inter-RAT reselection criteria, the inter-RAT reselection criteria prioritizes the first reselection candidate small cell over the second reselection candidate small cell when it is determined that the first reselection candidate small cell operates on a dedicated small cell frequency of the first cellular RAT that is not shared with macro cells of the first cellular RAT and the second reselection candidate small cell operates on a small cell frequency of the second cellular RAT shared with macro cells of the second cellular RAT, and
to select one of the first and second reselection candidate small cells as a final reselection candidate small cell based on the comparison, and
to execute a cell reselection to transition the user device from the macro cell to the final reselection candidate small cell; and
memory coupled to the processor for storing related data and/or instructions.

13. The apparatus of claim 12,
wherein the inter-RAT reselection criteria comprises a quality metric and a corresponding threshold for each of the first and second reselection candidate small cells,
the processor being configured to compare the quality metrics of the first and second reselection candidate small cells to the corresponding thresholds.

14. The apparatus of claim 13, wherein the processor is configured to:
select the first reselection candidate small cell as the final reselection candidate small cell if
(i) the quality metric for the first reselection candidate small cell is above the corresponding threshold for the first reselection candidate small cell and
(ii) the quality metric for the second reselection candidate small cell is below the corresponding threshold for the second reselection candidate small cell;
select the second reselection candidate small cell as the final reselection candidate small cell if
(i) the quality metric for the second reselection candidate small cell is above the corresponding threshold for the second reselection candidate small cell and
(ii) the quality metric for the first reselection candidate small cell is below the corresponding threshold for the first reselection candidate small cell; and
randomly select one of the first and second reselection candidate small cells as the final reselection candidate small cell if
(i) the quality metric for the first reselection candidate small cell is below the corresponding threshold for the first reselection candidate small cell and
(ii) the quality metric for the second reselection candidate small cell is below the corresponding threshold for the second reselection candidate small cell.

15. The apparatus of claim 14, wherein the processor is configured to randomly select based on a dynamically adjustable probability associated with relative network loading between the first and second reselection candidate small cells.

16. The apparatus of claim 13,
wherein the inter-RAT reselection criteria further comprises priority information for each of the first and second reselection candidate small cells,
the processor being further configured to:
set a user-defined priority for each of the first and second reselection candidate small cells; and
compare the user-defined priorities.

17. The apparatus of claim 16, wherein the processor is configured to, for each of the first and second reselection candidate small cells:
set a high priority for that small cell if that small cell is identified as operating on the dedicated small cell frequency;
set a low priority for that small cell if
(i) that small cell is not identified as operating on the dedicated small cell frequency and
(ii) absolute priority information is not available for that small cell; and
set an intermediate priority for that small cell based on absolute priority information if the absolute priority information is available for that small cell,
wherein for each of the first and second reselection candidate small cells, an order of priority from highest to lowest is the high priority, the intermediate priority, and the low priority.

18. The apparatus of claim 16, wherein the processor is configured to compare the quality metrics of the first and second reselection candidate small cells to the corresponding thresholds in response to the user-defined priorities being equal.

19. The apparatus of claim 16, wherein the processor is configured to compare the user-defined priorities in response to the quality metrics of the first and second reselection candidate small cells being both above or both below the corresponding thresholds.

20. The apparatus of claim 12,
    wherein the first reselection candidate small cell operates in accordance with a RAT that is associated with one of Long Term Evolution (LTE) or Universal Mobile Telecommunication System (UMTS), and
    wherein the second reselection candidate small cell operates in accordance with a RAT that is associated with the other one of LTE or UMTS.

21. The apparatus of claim 13, wherein the processor is configured to randomly select one of the first and second reselection candidate small cells as the final reselection candidate small cell if
    (i) the quality metric for the first reselection candidate small cell is above the corresponding threshold for the first reselection candidate small cell, and
    (ii) the quality metric for the second reselection candidate small cell is above the corresponding threshold for the second reselection candidate small cell.

22. The apparatus of claim 12,
    wherein the inter-RAT reselection criteria comprises priority information for each of the first and second reselection candidate small cells, and
    wherein the processor is configured to:
        set a user-defined priority for each of the first and second reselection candidate small cells;
        compare the user-defined priorities; and
        randomly select one of the first and second reselection candidate small cells as the final reselection candidate small cell when the user-defined priorities of the first or second reselection candidate small cells are not different.

23. An apparatus for cell reselection to transition a user device from a macro cell to a small cell, comprising:
    means for comparing among a plurality of reselection candidate small cells having overlapping coverage areas based on reselection criteria, the plurality of reselection candidate small cells including first and second reselection candidate small cells, wherein
        when the first and second reselection candidate small cells respectively operate in accordance with first and second cellular Radio Access Technologies (RATs) different from each other and the reselection criteria corresponds to inter-RAT reselection criteria,
        the inter-RAT reselection criteria prioritizes the first reselection candidate small cell over the second reselection candidate small cell when it is determined that the first reselection candidate small cell operates on a dedicated small cell frequency of the first cellular RAT that is not shared with macro cells of the first cellular RAT and the second reselection candidate small cell operates on a small cell frequency of the second cellular RAT shared with macro cells of the second cellular RAT;
    means for selecting one of the first and second reselection candidate small cells as a final reselection candidate small cell based on the comparison; and
    means for executing a cell reselection to transition the user device from the macro cell to the final reselection candidate small cell.

24. The apparatus of claim 23,
    wherein the inter-RAT reselection criteria comprises a quality metric and a corresponding threshold for each of the first and second reselection candidate small cells,
    wherein the means for comparing compares the quality metrics of the first and second reselection candidate small cells to the corresponding thresholds, and
    wherein the means for selecting randomly selects one of the first and second reselection candidate small cells as the final reselection candidate small cell if
        (i) the quality metric for the first reselection candidate small cell is above the corresponding threshold for the first reselection candidate small cell, and
        (ii) the quality metric for the second reselection candidate small cell is above the corresponding threshold for the second reselection candidate small cell.

25. The apparatus of claim 23,
    wherein the inter-RAT reselection criteria comprises priority information for each of the first and second reselection candidate small cells,
    wherein the means for comparing
        sets a user-defined priority for each of the first and second reselection candidate small cells; and
        compares the user-defined priorities, and
    wherein the means for selecting randomly selects one of the first and second reselection candidate small cells as the final reselection candidate small cell when the user-defined priorities of the first or second reselection candidate small cells are not different.

26. A non-transitory computer-readable medium comprising code, which, when executed by a processor, causes the processor to perform operations for cell reselection to transition a user device from a macro cell to a small cell, the non-transitory computer-readable medium comprising:
    code for comparing among a plurality of reselection candidate small cells having overlapping coverage areas based on reselection criteria, the plurality of reselection candidate small cells including first and second reselection candidate small cells, wherein
        when the first and second reselection candidate small cells respectively operate in accordance with first and second cellular Radio Access Technologies (RATs) different from each other and the reselection criteria corresponds to inter-RAT reselection criteria,
        the inter-RAT reselection criteria prioritizes the first reselection candidate small cell over the second reselection candidate small cell when it is determined that the first reselection candidate small cell operates on a dedicated small cell frequency of the first cellular RAT that is not shared with macro cells of the first cellular RAT and the second reselection candidate small cell operates on a small cell frequency of the second cellular RAT shared with macro cells of the second cellular RAT;
    code for selecting one of the first and second reselection candidate small cells as a final reselection candidate small cell based on the comparison; and
    code for executing a cell reselection to transition the user device from the macro cell to the final reselection candidate small cell.

27. The non-transitory computer-readable medium of claim 26,
    wherein the inter-RAT reselection criteria comprises a quality metric and a corresponding threshold for each of the first and second reselection candidate small cells, wherein the code for comparing comprises code for comparing the quality metrics of the first and second reselection candidate small cells to the corresponding thresholds, and wherein the code for selecting comprises code for randomly selecting one of the first and second reselection candidate small cells as the final reselection candidate small cell if
- (i) the quality metric for the first reselection candidate small cell is above the corresponding threshold for the first reselection candidate small cell, and
- (ii) the quality metric for the second reselection candidate small cell is above the corresponding threshold for the second reselection candidate small cell.

28. The non-transitory computer-readable medium of claim 26, wherein the inter-RAT reselection criteria comprises priority information for each of the first and second reselection candidate small cells, wherein the code for comparing comprises:
   code for setting a user-defined priority for each of the first and second reselection candidate small cells; and
   code for comparing the user-defined priorities, and wherein the code for selecting comprises code for randomly selecting one of the first and second reselection candidate small cells as the final reselection candidate small cell when the user-defined priorities of the first or second reselection candidate small cells are not different.

* * * * *